(12) United States Patent
Nakhare et al.

(10) Patent No.: US 10,733,828 B1
(45) Date of Patent: Aug. 4, 2020

(54) FIXED POINT-OF-SALE TERMINAL WITH CONFIGURABLE CREDIT CARD DEVICE

(71) Applicant: Toast, Inc., Boston, MA (US)

(72) Inventors: Gaurav Nakhare, Boston, MA (US); Boon Ping Ng, Andover, MA (US)

(73) Assignee: TOAST, INC., Boston, MA (US)

( * ) Notice: Subject to any disclaimer, the term of this patent is extended or adjusted under 35 U.S.C. 154(b) by 0 days.

(21) Appl. No.: 16/364,314

(22) Filed: Mar. 26, 2019

(51) Int. Cl.
| | | |
|---|---|---|
| *G07F 7/08* | (2006.01) | |
| *G07F 7/02* | (2006.01) | |
| *G06Q 20/20* | (2012.01) | |
| *G07G 1/00* | (2006.01) | |

(52) U.S. Cl.
CPC ......... *G07F 7/0886* (2013.01); *G06Q 20/204* (2013.01); *G07F 7/025* (2013.01); *G07F 7/0893* (2013.01); *G07G 1/0018* (2013.01); *G07G 1/0081* (2013.01)

(58) Field of Classification Search
CPC ..... G07F 7/0893; G07F 7/0873; G07F 7/0886
USPC ........................................ 235/380, 449, 484
See application file for complete search history.

(56) References Cited

U.S. PATENT DOCUMENTS

| | | | |
|---|---|---|---|
| 5,053,199 A | 10/1991 | Keiser et al. | |
| 5,196,680 A | 3/1993 | Schuder | |
| 5,438,186 A | 8/1995 | Nair et al. | |
| 6,021,948 A | 2/2000 | Tsai et al. | |
| D477,322 S | 7/2003 | Chien | |
| D604,730 S | 11/2009 | Shih et al. | |
| D619,140 S | 7/2010 | Sin et al. | |
| 7,748,636 B2 | 7/2010 | Finn | |
| D689,860 S | 9/2013 | Chong et al. | |
| D700,606 S | 3/2014 | Lo | |
| D701,860 S | 4/2014 | Daniel | |
| D706,266 S | 6/2014 | Rotsaert | |
| D707,677 S | 6/2014 | Azuma | |
| D728,675 S | 5/2015 | Daniel | |
| D736,208 S | 8/2015 | Gustafsson | |
| D740,285 S | 10/2015 | Templeton | |
| D740,286 S | 10/2015 | Templeton | |
| D740,819 S | 10/2015 | Weber et al. | |

(Continued)

OTHER PUBLICATIONS

Card Readers. (Design—© Questel) orbit.com. [online PDF] 23 pgs. Print Dates Range from Jun. 17, 2015 through Nov. 5, 2019. [retrieved Feb. 18, 2020] https://www.orbit.com/export/QPTUJ214/pdf2/94d60794-3d6c-49eb-8517-92e5be77c6f5-171752.pdf.

*Primary Examiner* — Paultep Savusdiphol
(74) *Attorney, Agent, or Firm* — Richard K. Huffman

(57) ABSTRACT

A fixed point-of-sale (POS) terminal is provided that includes a mounting device for affixing the fixed POS terminal in a fixed location, a housing that is coupled the mounting device, a touchscreen display on a face of the housing, and a credit card reader that is configurable for use disposed within the housing. The credit card reader has a first assembly including a mag stripe card reader, and a second assembly including a Europay Mastercard Visa (EMV) reader, where the second assembly is coupled to the first assembly. The first assembly rotates about an axis perpendicular to a plane in which the assemblies are disposed to one of a plurality of angular positions, the plurality of angular positions indicating an offset angle of the first assembly relative to the second assembly, where the credit card reader is coupled to the housing in the one of the plurality of positions.

20 Claims, 16 Drawing Sheets

(56) References Cited

U.S. PATENT DOCUMENTS

| | | | |
|---|---|---|---|
| D740,820 S | 10/2015 | Templeton et al. | |
| D755,179 S | 5/2016 | Wong | |
| 9,355,285 B1* | 5/2016 | Wade | G06K 7/01 |
| D766,238 S | 9/2016 | Nguyen | |
| D766,901 S | 9/2016 | Nguyen | |
| D776,658 S | 1/2017 | Zhu et al. | |
| 9,576,159 B1 | 2/2017 | Templeton et al. | |
| D795,869 S | 8/2017 | Templeton | |
| D797,739 S | 9/2017 | Templeton | |
| D797,740 S | 9/2017 | Nguyen | |
| 9,760,740 B1* | 9/2017 | Edwards | G06K 7/0004 |
| D818,809 S | 5/2018 | Hetrick et al. | |
| 1,000,781 A1 | 6/2018 | Babu et al. | |
| D842,819 S | 3/2019 | Maetani et al. | |
| 10,242,357 B1* | 3/2019 | Dorogusker | G06Q 20/204 |
| D871,407 S | 12/2019 | Isaacs et al. | |
| D878,367 S | 3/2020 | Rotsaert | |
| 10,579,836 B1 | 3/2020 | Edwards | |
| 2005/0035201 A1 | 2/2005 | Tsai et al. | |
| 2006/0192018 A1 | 8/2006 | Tsai et al. | |
| 2012/0118959 A1 | 5/2012 | Sather et al. | |
| 2013/0278122 A1 | 10/2013 | Edwards et al. | |
| 2014/0001263 A1* | 1/2014 | Babu | G06K 7/0004 235/440 |
| 2014/0001264 A1* | 1/2014 | Babu | G06F 1/3215 235/440 |
| 2016/0026831 A1* | 1/2016 | Babu | G06K 7/10297 235/440 |
| 2017/0076269 A1 | 3/2017 | Saeed et al. | |
| 2017/0308889 A1 | 10/2017 | Cameron et al. | |
| 2017/0364888 A1 | 12/2017 | Bell et al. | |
| 2018/0005226 A1 | 1/2018 | Terra et al. | |
| 2019/0114612 A1 | 4/2019 | Gerlach et al. | |
| 2019/0197814 A1 | 6/2019 | Senguttuvan et al. | |

* cited by examiner

FIXED POINT-OF-SALE TERMINAL WITH CONFIGURABLE CREDIT CARD DEVICE

CROSS-REFERENCE TO RELATED APPLICATIONS

This application is related to the following co-pending U.S. patent applications, each of which has a common assignee and common inventors, the entire disclosures of which are herein incorporated by reference.

| SERIAL NUMBER | FILING DATE | TITLE |
| --- | --- | --- |
| (TST.0126) | — | CONFIGURABLE CREDIT CARD DEVICE |
| (TST.0128) | — | HANDHELD POINT-OF-SALE TERMINAL WITH CONFIGURABLE CREDIT CARD DEVICE |
| (TST.0132) | — | CONFIGURABLE CREDIT CARD DEVICE |

BACKGROUND OF THE INVENTION

Field of the Invention

This invention relates in general to the field of payment processing and related techniques, and more particularly to a fixed point-of-sale (POS) terminal with a configurable credit card reader.

Description of the Related Art

Although credit accounts have existed for hundreds of years, up until the mid 1900's most people paid for goods and services via cash or check. Many businesses issued proprietary cards (e.g., charge plates) that allowed for payment within a particular business by taking a mechanical imprint of a card. Because of the convenience, many patrons began paying via these cards, notwithstanding that they required a different card for each different business.

In 1960, IBM introduced magnetic stripe (or "mag stripe") credit cards, and since that time patrons have been increasingly paying for goods and services using this type of card. With the advent of debit cards in the mid 1990's, payment via credit card increased exponentially. As one skilled in the art will appreciate, whereas retailers in the mid 1900's provided for payment only by cash or check, many merchants today only take credit cards. And credit card technologies continue to evolve. These technologies provide for versatility and ease of use by using near field communication (NFC) techniques, so-called "tap to pay" mechanisms, and for security of cardholder information by using "smart" integrated circuits that are embedded in the cards themselves, so called "chip cards."

Presently, this worldwide industry is experiencing a switch from mag strip and NFC cards to chip cards, more formally known as Europay, Mastercard, and Visa (EMV) chip cards, and with the introduction of APPLE PAY® in 2014, NFC payment mechanisms are now transitioning from cards to mobile payment technologies that allow patrons to pay via a credit card app embedded in their smart phone or tablet.

Regarding processing of EMV cards, the requirements for data encryption, security, transfer protocols, and etc. are governed and specified by a set of standards collectively referred to as Payment Card Industry Data Security Standard (PCI DSS), the latest release of which is version 3.2.1, May 2018). The standard lays out requirements for the cards themselves, and additionally for electronic devices that are employed to extract and transmit information programmed into the embedded EMV chips dispose on the EMV cards. Accordingly, to "read" an EMV card, an electronic EMV card reading device (or, "EMV reader") must pass a series of tests in order to be certified to be used to process payment transactions.

As one skilled in the art will additionally appreciate, certification of an EMV card reader to PCI DSS standards, regardless of the level of certification, is a very costly process. It is beyond the scope of the present application to provide an in-depth tutorial of the details associated with certification of EMV card readers. Rather, it is sufficient to note that each newly developed EMV reader must undergo certification, and that the certification process is costly and lengthy, incurring significant opportunity cost.

In the case of a credit card processing device manufacturer that develops one or two credit card readers every year or two, the cost of certification may be acceptable given the market for the readers. However, the present inventors have observed that such costs are onerous and unacceptable for integrated point-of-sale (POS) system manufacturers that develop, deploy, and maintain substantial numbers of POS systems of varying type and form that are configured to comport to purchasing retailer's requirements. These POS systems may comprise a number of POS terminals that are programmed for use in different areas of a retail establishment such as, but not limited to, customer greeting areas (e.g., host POS terminals), order entry and payment areas that may comprise fixed or mobile POS terminals for use by staff or self-service kiosk POS terminals, order processing areas, inventory areas, warehouse areas, etc. Some of these areas may not require integrated or attached credit card readers, but some areas—especially customer engagement areas—definitely require credit card processing capabilities. And, as one skilled in the art will appreciate, user experience is one of the most important factors in acceptance of different POS terminal configurations and, consequently, it is desirable to provide different credit card readers in several different orientations that include, but are not limited to, mag stripe reader and EMV reader on the same face, mag stripe reader and EMV reader on opposite faces, mag stripe reader and EMV reader on adjacent faces, etc. Yet, to certify each of the different credit card readers is, as noted above, very costly.

Therefore, what is needed is a single credit card reader that includes an NFC reader, a mag stripe reader, and an EMV reader, where the credit card reader is configurable for use in one or a plurality of different orientations.

What is also needed is a mobile POS terminal having a single credit card reader integrated therein, where the credit card reader includes an NFC reader, a mag stripe reader, and an EMV reader, where the credit card reader is configurable for use in one or a plurality of different orientations.

What is further needed is a fixed POS terminal having a single credit card reader integrated therein, where the credit card reader includes an NFC reader, a mag stripe reader, and an EMV reader, where the credit card reader is configurable for use in one or a plurality of different orientations.

What is moreover needed is a stand-alone credit card reader that includes an NFC reader, a mag stripe reader, and an EMV reader, where the credit card reader is configurable for use in one or a plurality of different orientations for adaptation to a corresponding dock.

SUMMARY OF THE INVENTION

The present invention, among other applications, is directed to solving the above-noted problems and addresses other problems, disadvantages, and limitations of the prior art. The present invention provides a superior technique for providing a credit card reader that is configurable for use.

In one embodiment, a fixed point-of-sale (POS) terminal is provided that includes a mounting device for affixing the fixed POS terminal in a fixed location, a housing that is coupled the mounting device, a touchscreen display on a face of the housing, and a credit card reader that is configurable for use disposed within the housing. The credit card reader has a first assembly including a mag stripe card reader, and a second assembly including a Europay Mastercard Visa (EMV) reader, where the second assembly is coupled to the first assembly. The first assembly rotates about an axis perpendicular to a plane in which the assemblies are disposed to one of a plurality of angular positions, the plurality of angular positions indicating an offset angle of the first assembly relative to the second assembly, where the credit card reader is coupled to the housing in the one of the plurality of positions.

In one aspect, the present invention contemplates a fixed point-of-sale (POS) terminal is provided that includes a mounting device for affixing the fixed POS terminal in a fixed location, a housing that is coupled the mounting device, a touchscreen display on a face of the housing, and a credit card reader that is configurable for use disposed within the housing. The credit card reader has a first assembly including a contactless card reader and a mag stripe card reader, and a second assembly including a Europay Mastercard Visa (EMV) reader, where the second assembly is coupled to the first assembly. The first assembly rotates about an axis perpendicular to a plane in which the assemblies are disposed to one of a plurality of angular positions, the plurality of angular positions indicating an offset angle of the first assembly relative to the second assembly, where the credit card reader is coupled to the housing in the one of the plurality of positions.

Another aspect of the present invention comprehends a method for configuring a credit card reader for use as part of a fixed point-of-sale (POS) terminal, the method comprising: coupling a credit card reader to the fixed POS terminal, the fixed POS terminal comprising a mounting device for affixing the fixed POS terminal in a fixed location, a housing that is attached to the mounting device, and a touchscreen display on a face of the housing, the coupling comprising: first disposing a mag stripe card reader within a first assembly; second disposing a Europay Mastercard Visa (EMV) reader within a second assembly; and coupling the second assembly to the first assembly, where the first assembly rotates about an axis perpendicular to a plane in which the assemblies are disposed to one of a plurality of angular positions, the plurality of angular positions indicating an offset angle of the first assembly relative to the second assembly, and where the credit card reader is coupled to the housing in the one of the plurality of positions.

BRIEF DESCRIPTION OF THE DRAWINGS

These and other objects, features, and advantages of the present invention will become better understood with regard to the following description, and accompanying drawings where.

DETAILED DESCRIPTION

Figure 1:
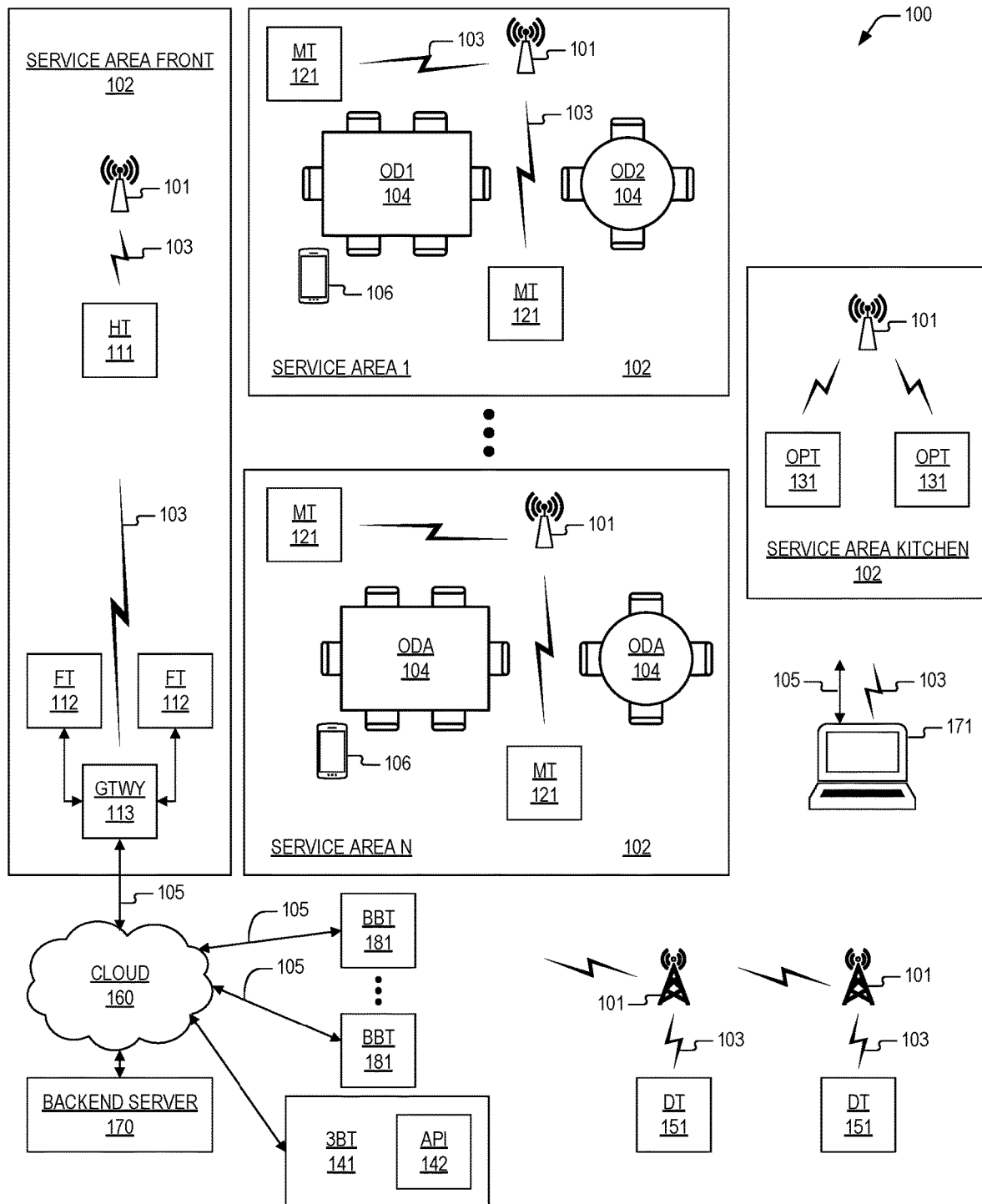
FIG. 1 is a block diagram illustrating a synchronization system for point-of-sale (POS) terminals according to the present invention.

Exemplary and illustrative embodiments of the invention are described below. It should be understood at the outset that, although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application," "application," "computer program," "application program," or "program") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Multi-Core Processor: Also known as a multi-core microprocessor, a multi-core processor is a microprocessor having multiple CPUs ("cores") fabricated on a single integrated circuit.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

In view of the above background discussion on credit card readers and associated techniques employed to certify these present-day credit card readers for use, a discussion of the present invention will now be presented with reference to FIGS. 1-16.

Turning to FIG. 1, a block diagram is presented illustrating a synchronization system 100 for point-of-sale (POS) terminals according to the present invention. The synchronization system 100 may include one or more service areas 102, such as a front service area 102, service area 1-service area N 102, and service area kitchen 102. Going forward, the present inventors note that though the present invention is applicable to any type of retail establishment as is described above, a restaurant establishment will be henceforth employed in order to teach relevant aspects of the present invention. The present inventors further note that though restaurant terms such as host, wait staff, cook, kitchen, food item, etc. may be employed, such terms are used to more clearly teach the present invention in a given context; however, broader and different retail establishment types are contemplated.

The service areas 102 may comprise one or more wireless access points 101. The service areas 102 may also comprise one or more wireless POS terminals 111, 121, 131, coupled to the access points 101 via wireless links 103, and which are distinguished in the system 100 as a host terminal 111, mobile terminals 121, and order processing terminals 131.

The service areas 102 may comprise one or more wireless access points 101. The service areas 102 may also comprise one or more mobile POS terminals 121 coupled to the access points 101 via wireless links 103. Typically, the mobile POS terminals 121 are of an 8-inch handheld display size, though other sizes are contemplated. The service areas 102 may further comprise one or more host terminals 111, which may be coupled to the access points 101 via wireless links 103. Alternatively, the host terminals 111 may be hardwired. The service areas 102 may further comprise one or more fixed terminals 112 that are hardwired to a gateway 113. Alternatively, one or more of the fixed terminals 112 may be coupled to the access points 101 via the wireless links 103. Typically, the host terminals 111 and fixed terminals 112 are approximately of a 15-inch POS display size, though other sizes are contemplated. The service areas 102 may further comprise one or more order processing terminals 131 that are coupled to the access points 101 via the wireless links 103. Alternatively, the order processing terminals 131 may be hardwired to the gateway 113. Typically, the order processing terminals 131 are approximately of a 22-inch display size, though other sizes are contemplated. Thus, the mobile terminals 121 are referred to as such because they move about the service areas 102. As a result, the mobile terminals are all coupled to the access points 101 via the wireless links 103. The host terminal 111 may be moved about the services areas 102 as well, in which case it will be categorized as mobile, though having a larger display size generally than the mobile terminals. Or the host terminal 111 may be in a fixed location, typically mounted to a stand (not shown), and may be wireless or hardwired. When in a fixed location, the host terminal 111 is categorized as fixed.

The gateway 113 provides for coupling of the terminals 112 (optionally, 112, 131) that are hardwired and access points 101 an internet cloud 160 via conventional wired links 105 such as, but not limited to, Ethernet, cable, fiber optic, and digital subscriber line (DSL). As part of the network path to and through the cloud 160, providers of internet connectivity (e.g., ISPs) may employ wireless technologies from point to point, etc., but for purposes of this application, such links 105 will be referred to as conventional wired links 105 to distinguish them from local and cellular wireless links. The wireless links 103 may comprise, but are not limited to, Wi-Fi, Bluetooth, near field communications, infrared links, IEEE 802.15.4, Zigbee radio links, and cellular based links (e.g., 3G, 4G, LTE, 5G) or a combination of the noted links. The POS terminals 111, 112, 121, 131 may be configured differently to comport with intended function (i.e., host seating, order entry, order fulfillment, payment processing, etc.), or they may be configured similarly. In one embodiment, the mobile terminals 121 may comprise a touch screen display and integral payment processor (e.g., card/chip/tap readers) that provides for both order entry, display of order status, and payment processing. The host terminal 111, fixed terminals 112, and order processing terminals 131 may comprise larger touch screens to allow for easier viewing by restaurant staff, or they may comprise displays with keyboard entry. In one embodiment, terminals 111, 112, 131 may comprise desktop computers, laptop computers, smartphones, or tablets that are running application programs or web-enabled application programs that provide for communication with a backend server 170 for purposes of order entry, status updates, and optionally, payment processing. In one embodiment, one or more of the terminals that are characterized as fixed may comprise an integral payment processor (i.e., card/chip/tap reader) that provides for payment processing.

The backend server 170 is coupled to the internet cloud 160 and to an administrative console 171 that is operably coupled to the backend server 170 via a conventional wired link 105 and/or a wireless link 103. The backend server 270 is not on-premise and is thus referred to as a cloud server 270. The administrative console 171 may be disposed within the restaurant premises and coupled to the backend server 170 via the links 103, 105, or the console 171 may be disposed in another location, say, at an operations headquarters for multiple restaurants within a given region. In addition, the system 100 may comprise one or more browser-based terminals 181 that are coupled to the backend server 170 via links 105. In one embodiment, the browser-based terminals 181 may comprise desktop computers, laptop, computers, smartphones, or tablets that are running stand-alone applications or web-enabled applications that provide for communication with the backend server 170 for purposes of order entry, status updates, and optionally, payment processing, where payment data is manually entered.

The system 100 may further comprise one or more third-party-based terminals 141 that are coupled to the backend server 170 via the conventional links 105 though the cloud 160. The third party-based terminals 141 may comprise desktop computers, laptop, computers, smartphones, or tablets that are running stand-alone third-party applications or web-enabled third-party applications that provide for communication with the backend server 170 for purposes of order entry, status updates, and optionally, payment processing via a proprietary application programming interface (API) 142. An example of such a terminal 141 may include the well-known GrubHub® third-party application that is configured to communicate with the backend server 170 via the API 141.

The system 100 may additionally comprise one or more mobile delivery terminals 151 that are coupled to one or more cellular access points 201 via conventional cellular wireless links 103, and the cellular access points 101 are coupled to the backend server 170 via the cloud 160. In one embodiment, the delivery terminals 151 are identical to the mobile terminals 121, and are configured to provide services for order entry, order fulfillment (i.e., delivery), and payment processing. In another embodiment, the delivery terminals 151 are disposed as smartphone or tablets with a detachable payment processor (e.g., card/chip/tap reader). In a further embodiment, the delivery terminals 151 are disposed as smartphone or tablets with a payment processor integrated within a single housing. Other embodiments are contemplated.

Service areas 102 corresponding to the mobile terminals 121 may have one or more tables 104 corresponding to one or more orders. For clarity, service area 1 102 depicts two tables 104, one of which corresponds to order 1 OD1, and the other of which corresponds to order 2 OD2. The mobile terminals 121 within service area 1 102 may processes portions of both order 1 OD1 and order 2 OD2.

Service area N 102 depicts two tables 104, both of which correspond to order A ODA. The mobile terminals 121 within service area N 102 may both process portions order A ODA.

Though disposed within separate service areas (service area 1 102—service area N 102), the mobile terminals 121 therein may be further configured to process portions of any and all orders within the restaurant and may roam from service area 102 to service area to support work load of the restaurant.

The order processing terminals 131 may process all orders in the restaurant, or they may be configured to each process a portion of all of the orders in the restaurant according to preparation station or inventory station.

The host terminal 111 and fixed terminals 112 may be configured to process all orders in the restaurant to provide for on-premise seating assignment, order initiation, order selection, and payment processing, including closeout of orders.

One or more restaurant staff members (not shown) within service area 1 102—service area N 102 may have a personal device (e.g., smartphone, tablet, laptop) 106 that can provide an ad hoc network (i.e., hotspot) to which one or more of the mobile terminals 121 may tether for purposes of communicating with the backend server 170 in the absence of Wi-Fi connectivity to the access points 101.

In one embodiment, operations are initiated when the one or more patrons enter the restaurant. Generally, a host (not shown) will create an order (along with corresponding order identifier (OID) via the host terminal 111 for the one or more patrons and will seat the patrons at one or more tables 104. The created order may include service area designation and assignment of the order to one or more mobile terminals 121. In another embodiment, mobile terminals 121 within a service area 102 are assigned to all orders within that service area 102. Other embodiments are contemplated. The created order and service area assignment are transmitted over the cloud 160 to the backend server 170, which maintains a durable terminal queues within which are stored order updates for all orders in the restaurant. Each of the plurality of durable queues correspond to each of the POS terminals 111, 112, 121, 131, 151 within the system 100. When connection status to a given terminal 111, 112, 121, 131, 151 is down (i.e., the server 170 cannot verify communication with the given terminal 111, 112, 121, 131, 151), then the server 170 maintains the order updates for that terminal 111, 112, 121, 131, 151 until connectivity is reestablished, at which time the server 170 may transmit one or more of the order updates to the terminal, verifying with each transmission that the terminal 111, 112, 121, 131, 151 received the update. Advantageously, each of the terminals 111, 112, 121, 131, 151 is capable of processing portions of any of the orders in the restaurant.

Likewise, each of the terminals 111, 112, 121, 131, 151 maintains durable order queues within which are stored order updates only for each of the orders being processed by the terminal 111, 112, 121, 131, 151. Each of the 111, 112, 121, 131, 151 also maintains a plurality of order states that depict a current state for each of the orders in the restaurant. As a seated patron selects one or more menu items, wait staff enters the menu items as an update in one of the terminals 111, 112, 121, 131, 151, generally a mobile terminal 121 assigned to the given service area 102. The order update is entered into one of the durable order queues that corresponds to the order ID. If connectivity is present, then the terminal 111, 112, 121, 131, 151 transmits the order update to the server 270 and waits for the server 270 to acknowledge the order update. If acknowledged, the terminal 111, 112, 121, 131, 151 removes the order update from the one of the durable order queues. If unacknowledged (i.e., in the case of non-persistent network connectivity), the terminal 111, 112, 121, 131, 151 maintains the order update in the one of the durable order queues until such time as connectivity is reestablished, and the terminal 111, 112, 121, 131, 151 completes transmission of the order update with acknowledgement by the server 170.

Upon reception of a particular update from the server 170, the terminals 111, 112, 121, 131, 151 may check one of their plurality of order states that correspond to the particular update for conflicts. If a conflict exists, the terminals 111, 112, 121, 131, 151 may utilize domain specific rules to resolve the conflict in order to establish a valid order state. Each of the terminals 111, 112, 121, 131, 151 is configured with the same domain specific rules to provide for consistent resolution of order states.

As patrons continue to order items corresponding to the order ID, the one or more of the terminals 111, 112, 121, 131, 151 may enter the order updates and transmit/durably queue the order updates to the server 170 in accordance with connectivity conditions. The server 170 may also queue/transmit order updates for all orders in the restaurant to each of the terminals 111, 112, 121, 131, 151 according each terminal's connectivity. Order fulfillment, payment, and closeout are likewise handled as order updates through the server 170 and are queued/transmitted to all of the terminals 111, 112, 121, 131, 151 in accordance with the connection status of each terminal.

Patrons outside of the restaurant are also handled in similar fashion via the browser-based terminals 181, and third-party terminals 141, though without feedback from the server 170 regarding all orders in the restaurant. When accessed through the browser-based terminals 181 and third-party terminals 141, the server 170 creates and order ID and assigns it to one of the order processing terminals 131 for fulfillment, while sending status updates on the order ID to all of the terminals 111, 112, 121, 131, 151 via the durable terminal queue therein. The server 170 may designate a specific delivery terminal 151 for pickup, delivery, and payment based upon geofenced proximity to the restaurant, or based upon workload corresponding to the delivery terminal. Proximity to the restaurant may be determined by a number of different mechanisms, as will be described in further detail below.

The administrative console 171 may maintain a master record of all order states and order updates according to all of the terminals 111, 112, 121, 131, 151 in order to provide for restaurant management, maintenance, analytics, and network traffic analyses. The console 171 may alternatively be disposed in an expediter's area of the restaurant for use by expediters in assignment and allocation of patron seating and terminals 111, 112, 121, 131, 151.

The durable terminal queues and durable order queues may be disposed as battery backed random-access memory, electrically-erasable programmable read-only memory, solid state memory, hard disk memory, or a combination of the above that will provide for maintaining order updates within the queues across network and power interruptions.

Advantageously, the present invention provides for more efficient performance of computational resources within the server 170 and the POS terminals 111, 112, 121, 131, 151 over that which has heretofore been provided because multiple 111, 112, 121, 131, 151 may be assigned to process portions of a single order, resulting in more timely processing of the single order. Similarly, any of the 111, 112, 121, 131, 151 in the restaurant may be immediately reassigned to a particular order to replace a malfunctioning terminal or to increase throughput of the server 170. Accordingly, computational resources 111, 112, 121, 231, 151, 170 within the system 100 are afforded an overall performance improvement as a result of the present invention.

Figure 2:
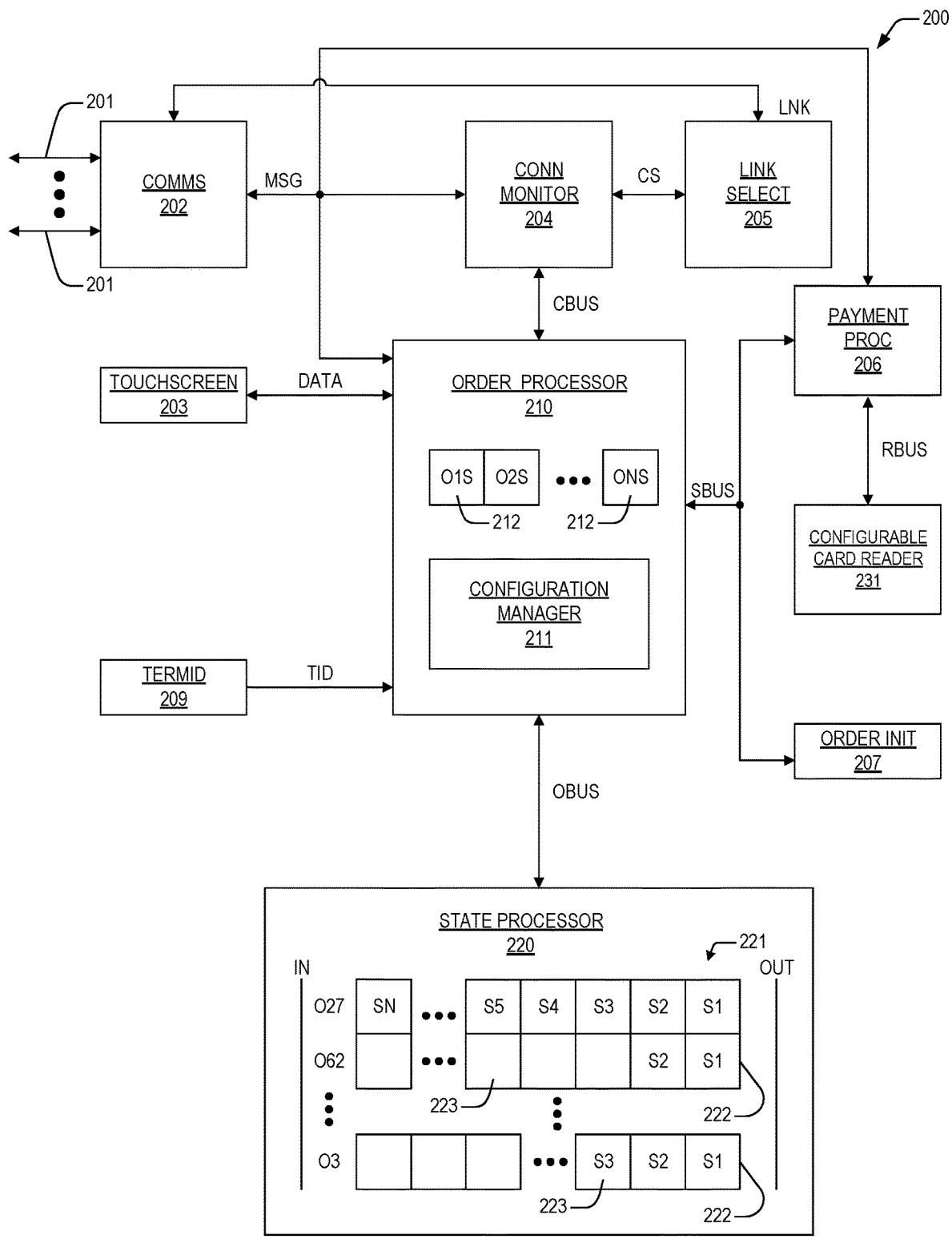
FIG. 2 is a block diagram depicting a POS terminal according to the present invention.

Now referring to FIG. 2, a block diagram is presented depicting a POS terminal 200 according to the present invention. The POS terminal 200 may be characterized as fixed or mobile. When characterized as fixed, the POS terminal 200 may be hardwired to a gateway or may be coupled to the gateway via wireless access points, as described above with reference to FIG. 1. The terminal 200 may comprise a communications circuit COMMS 202 (e.g., transceivers, modems, message formatter, etc.) that is coupled to one or more wired or wireless communications links 201, examples of which are described above with reference to FIG. 1. The terminal 200 may also comprise a connection monitor 204, an order processor 210, a and a payment processing element 206, all of which are coupled to COMMS 302 via a message bus MSG. The payment processing element 206 may be coupled to a configurable card reader 231 according to the present invention. The terminal 200 may also comprise a link select element 205 that is coupled to the connection monitor via bus CS and to the COMMS 202 via bus LNK. The order processor 210 is coupled to the connection monitor 204 via bus CBUS and to the payment processor 206 and an order initiation element 207 via bus SBUS. The order processor 210 is coupled to a touchscreen display 203 via bus DATA and to a terminal ID element 209 via bus TID. The order processor 210 is also coupled to a state processor 220 via a queue bus QBUS.

The state processor 220 may include a durable order update queue 221 that includes order update records 222, each of which are associated with a corresponding order for the terminal 200. Individual terminals 200 are identified by their corresponding terminal ID, which may be stored within and accessed from the terminal ID element 209. The terminal ID element 209 also is employed for storage and retrieval of terminal configuration information (e.g., order processing terminal, kiosk, mobile terminal, host terminal, etc.).

Each of the order update records 222 may comprise order state fields 223, which are employed to queue order state changes (i.e., order updates) for transmission to a backend server (not shown) as connectivity to the backend server permits. State fields 223 nearest to OUT are the oldest order state changes queued for transmission to the backend server. State fields 223 nearest to IN are youngest (or most recent) order state changes queued for transmission to the backend server. Fields 223 between the oldest state fields 223 and the youngest state fields 223 descend in age from oldest to youngest order state change according to when those state changes are entered by the terminal 200.

Values of the order state fields 223 may include, but are not limited to, an order ID along with order details taken by the terminal 200. Accordingly, the order update record 222 for order 27 O27 depicts a plurality of order state fields 223 to be transmitted to the server when connectivity is reestablished. In decreasing age from oldest to youngest order state change, the fields 223 depict order state changes S1 through SN. As one skilled in the art will appreciate, the order update record 222 O27 depicts that many more state changes have been entered while connection status of the terminal 200 is down than have been entered for order 62 O62 through order 3 O3. Advantageously, the terminal 200 according to the present invention may be employed for entry of order updates even in the presence of network interruptions, which is characteristic of most Wi-Fi networks.

In operation, order state changes S1-SN result from two sources: the touchscreen display 203 and messages received over COMMS 202 from the backend server. In the first case, wait staff may enter menu items as requested by patrons, or in the case that the terminal 200 is configured as a kiosk 200, the patrons may enter the order items themselves. The present invention contemplates provisions within the terminal 200 to display menu selections and payment options to both wait staff and patrons. Order items received from the touchscreen display 203 are provided to the order processor 210 via bus DATA, which generates the state changes. State changes S1-SN received from the backend server are provided to the order processor 210 via messages received over bus MSG. The terminal 200 may be further configured as a tableside kiosk 200 that is unattended, such as in found in some restaurants and activity concepts like bowling alleys, golf gaming venues (e.g., Topgolf). As a tableside kiosk 200, patrons are enabled to add to existing orders to purchase additional items.

The connection monitor 204 may monitor reception of a first message (e.g., a ping message) from the backend server and direct transmission of an acknowledgement message. The connection monitor 204 may update the connectivity status of the terminal 200 accordingly. In one embodiment, acknowledgment may comprise a simple acknowledge message. In other embodiments, acknowledgement may comprise additional data such as received signal strength indication RSSI associated with one or more access points, number of hops between the backend server and the terminal 200, or Global Positioning System (GPS) coordinates.

The link select element 205 may be employed to direct the COMMS 202 to change links 201 over which to communicate with the backend server, such as switching from Wi-Fi to LTE, for example. In one embodiment, in the absence of connectivity within the restaurant, the link select element 205 may direct the COMMS 202 to tether to a cellular equipped device corresponding to an order ID, such as devices 106 in FIG. 1, in order to transmit acknowledgements and order state changes to the backend server.

The connection monitor 204 may provide connectivity status of the terminal 200 to the order processor 210 via bus CBUS. In one embodiment, the order processor 210 may generate order state change messages from oldest to youngest update for each of the orders in the queue 221. Connectivity is maintained when the terminal 200 receives acknowledgement of a previously transmitted order state change message from the backend server. Once acknowledged, the order processor 210 directs the state processor 220 to delete the oldest state change update for a corresponding order ID and shift pending updates so that the next oldest state change update becomes the oldest order update. In one embodiment, state change updates are transmitted to the backend server until its order state change record 222 is empty, or until connectivity goes down.

As discussed above, the terminal 200 may be configured as a fixed or mobile POS terminal, a kiosk, a host terminal, a management terminal, or an order processing terminal, where configurations differ principally in size of the touchscreen display 203 and perhaps configuration of displayed items. The configuration parameters for the terminal 200 are stored in the terminal ID 209 element, and the configuration parameters/features are accessed by a configuration manager 211 within the order processor 210 upon initialization/reconfiguration of the terminal 200. Thus, the configuration manager 211 may generate images for display on the touchscreen display 203 and capture text and touches thereon, in accordance with functions prescribed according to configuration parameters/features accessed from the terminal ID element 209.

Messages received from the communications circuit 202 may also require additional functions to be performed by the terminal 200. For example, when orders are placed by a browser-based or third-party based terminal, the backend server may transmit the order state change to the terminal 200 and the order processor 210 may direct the state processor 220 to create a corresponding order status record 222 in the queue 221. Similarly, when processing of transactions outside of the terminal's capabilities (e.g., financial transactions with credit card providers, loyalty card discounts, etc.) are required, order processor 210 may direct the payment processor 206 to generate messages to the backend server to provide data (e.g., amounts, payment source type, card swipe/chip information, etc.) to complete the transactions. Such messages are transmitted via COMMS 302. The payment processor 204 may further receive state changes (e.g., "order paid," "payment source 1 approved," "discount amount," etc.) to from the backend server and may provide these state changes to the order processor 210 via TBUS. The order processor 210 may then provide those updates to the queue 221 via OBUS. The terminal 200 may further be employed to create an order. Accordingly, from order entry data received over DATA, the order processor 210 may direct the order initiation element 207 to create an order ID and may also direct the state processor 220 to create a corresponding order state record 222 in the queue 221.

The terminal 200 may also be employed to enter and process payment data for orders. For credit card transactions, patrons and/or wait staff may employ the configurable card reader 231 to extract payment data from credit cards via any of three well known techniques: magnetic striped cards, cards with embedded chips, or contactless cards. As one skilled in the art will appreciate, magnetic striped card techniques are well known and ubiquitous. These cards are swiped through a magnetic stripe reader, wherein card numbers, cardholder name, and etc. are encoded on a magnetic strip on the back of the magnetic striped card. In more recent years, more secure credit cards have been developed according to the Europay, Mastercard, Visa (EMV) standards, namely the global standard for chip-based debit and credit card transactions. EMV cards are more secure because account numbers and cardholder information are encrypted. As such, processing of EMV cards requires a reader 231 with EMV capabilities. In very recent years, contactless cards are being deployed that utilize near field communications (NFC) techniques to transfer account numbers and cardholder information to the configurable reader 231. Accordingly, the configurable card reader 231 according to the present invention may be employed to read payment information from mag stripe cards, EMV (i.e., chip-based) cards, contactless (or, "NFC") cards, or any other form of contactless payment such as, but not limited to, wearables such as smart watches, smart phones, and integrated circuits embedded in the skin, where these wearables support features like the well-known Apple Pay, Google Pay, Android Pay, Samsung Pay, and other services for contactless payment.

In one embodiment, the configurable card reader 231 is a single assembly providing for all three card reading technologies (i.e., mag stripe, EMV, and NFC) that may be additionally configured for use according to orientation of EMV insertion slot position (or "dip" position) relative to orientation of mag stripe reader position, as will be described in more detail below. Upon swipe/dip/tap of a respective credit card, the reader 231 transfers payment information obtained therefrom over bus RBUS to the payment processing element 206, which generates messages over MSG to the backend server for approval for an processing of order payments.

The terminal 200 terminal according to the present invention is employed to maintain a current state of all orders being fulfilled by the restaurant. The current state of each of the orders is stored in order current state fields 212 within the order processor 210. The order processor 210 may also comprise domain specific rules (not shown), which define actions required to synchronize conflicting order state changes being received and/or processed by the terminal 200, where the domain specific rules are unique to the restaurant. For example, suppose that one terminal 200 transmits a state change for a specific order to the backend server, which is acknowledged by the backend server. Concurrently, a second terminal 200 sends a state change for the same order. The backend server may respond to the second terminal with a message indicating that the order current state field 212 for the order ID within the second POS terminal 200 state is out of date (due to connection status) and providing the most recent current state of the order. The domain specific rules are employed by the order processor 210 within the second terminal 200 to merge the state changes local to the second terminal 200 and may store the merged state in the corresponding current state field 212. The order processor 210 may then direct the COMMS 202 to transmit the corresponding (reconciled) state field 212 contents to the backend server for distribution to all of the terminals 400 in the restaurant.

Advantageously, the present invention provides for improvements in performance of computational resources within the terminals 200 over that which has heretofore been provided because the terminal 200 may be employed to process orders in the absence of network connectivity. In addition, unnecessary communications with the backend server are precluded due to on-board conflict resolution logic. Moreover, computing performance is increased because the terminal 200 may be employed to process any of the other orders within the restaurant because the current states of all restaurant orders are resident therein. Overall improvements in the art are achieved through the synergistic and tailorable employment of facial recognition, voice commands, 3D gestures, and suggested menu selections based upon detected menu keywords.

Further improvements are achieved through use of a card reader 231 that is configurable for use in more than one orientation, as will be described below.

The terminal 200 according to the present invention is configured to perform the functions and operations as discussed above. The terminal 200 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 200 may be shared with other circuits, microcode, etc., that are employed to perform other functions and/or operations within the terminal 200. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The terminal 200 may be embodied as one or more central processing units (CPUs) that are coupled to transitory and non-transitory storage (i.e., memory), where one or more application programs that are configured to perform the functions discussed above are stored in the non-transitory storage, transferred to the transitory storage at run time, and executed by the one or more CPUs.

Figure 3:
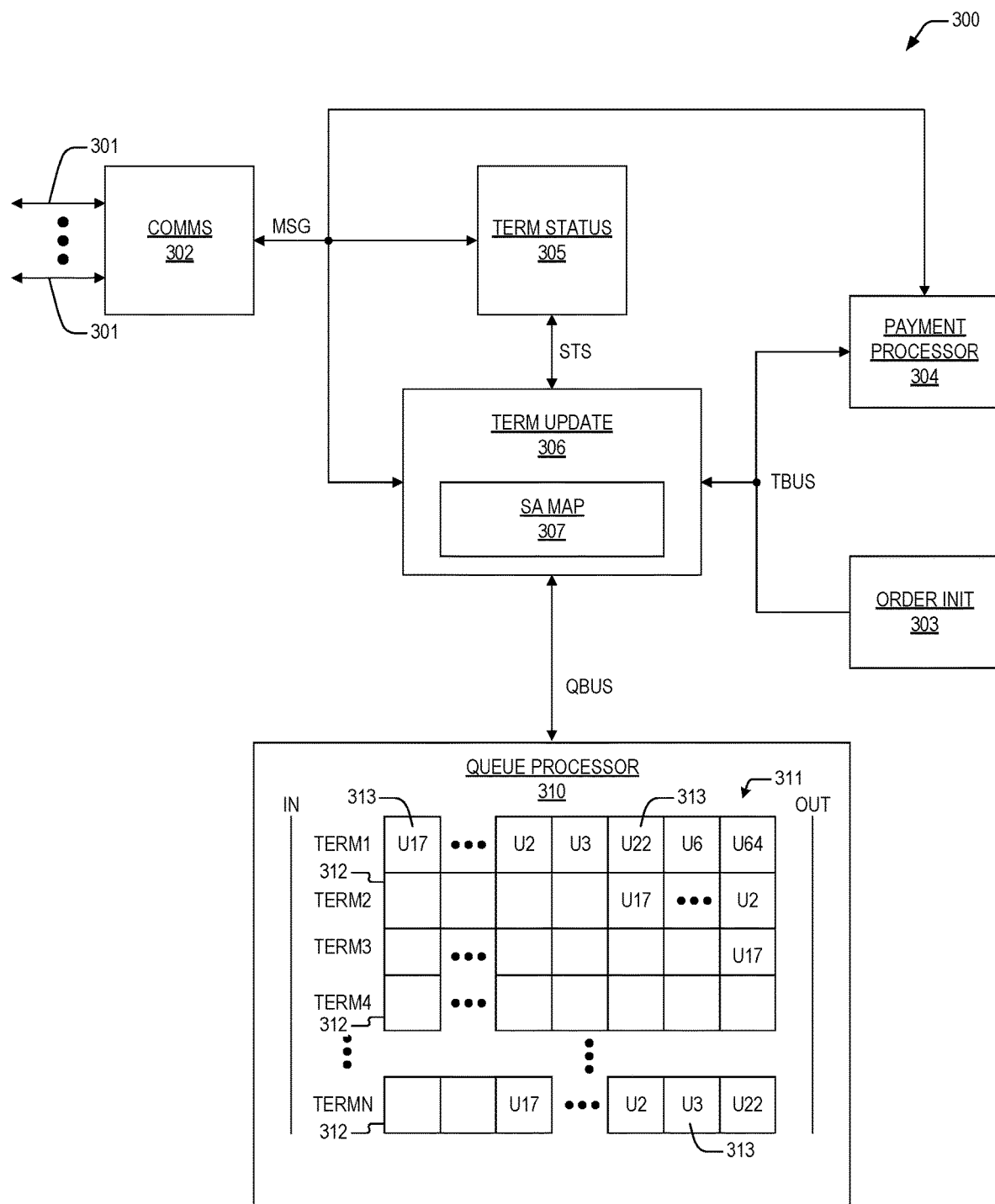
FIG. 3 is a block diagram featuring a backend server according to the present invention.

Now turning to FIG. 3, a block diagram is presented featuring a backend server 300. The server 300 may comprise communications circuitry COMMS 302 (e.g., transceivers, modems, message formatter, etc.) that is coupled to one or more wired or wireless communications links 301, examples of which are described above with reference to FIG. 1. The server 300 may also comprise a terminal status element 305, a terminal update element 306, and a payment processor 304, all of which are coupled to COMMS 302 via a message bus MSG. The terminal status element 305 is coupled to the terminal update element 306 via a status bus STS. The terminal update element 306 may comprise a service area map SA MAP 307. The terminal update element 306 is coupled to the payment processor 304 and an order initiation element 303 via a terminal bus TBUS. The terminal update element 306 is also coupled to a queue processor 310 via a queue bus QBUS.

The queue processor 310 may include a durable terminal queue 311 that includes terminal update records 312, each of which are associated with a corresponding terminal, such as the terminals 111, 112, 121, 131, 151 discussed with reference to FIG. 9, that are employed within a given restaurant. In the embodiment of FIG. 3, N terminal update records 312 are shown, each associated with a corresponding one of N terminals for the given restaurant. In a large restaurant or big box environment, N may be roughly equal to 30 terminals, though larger and smaller numbers are contemplated.

Each of the terminal update records 312 may comprise update fields 313, which are employed to queue order updates for transmission to each of the corresponding terminals as connectivity to the corresponding terminals permits. Update fields 313 nearest to OUT are the oldest order updates queued for transmission to the corresponding terminals. Update fields 313 nearest to IN are youngest (or most recent) order updates queued for transmission to the corresponding terminals. Fields 313 between the oldest order updates and the youngest order updates descend in age from oldest to youngest update according to when those updates are received from others of the corresponding terminals.

Values of the order update fields 313 may include, but are not limited to, an order ID along with order details, including payment information, taken by the others of the corresponding terminals. Accordingly, the terminal update record 312 for terminal 1 TERM1 depicts a plurality of order update fields 313 to be transmitted to TERM1 when connectivity is reestablished with TERM1. In decreasing age from oldest to youngest order update, the fields 313 depict updates to order 64 U64, then order 6 U6, then order 22 U22, and so on, culminating with an update to order 17 U17. As one skilled in the art will appreciate, the terminal update record 312 for TERM1 is indicative that TERM1 has been offline (i.e., no connectivity) longer than any of the other terminals in the restaurant. This length of time may correspond to a mobile terminal that is serving a party on a restaurant porch that has poor Wi-Fi connectivity, or may correspond to a delivery terminal that is traversing an area with poor cellular coverage. The terminal update records 312 corresponding to TERM2, TERM 3, and TERMN depict a number of populated order update fields 313 less than the number of fields for TERM1, which may correspond to terminals within the restaurant that have only slightly intermittent connectivity. And the terminal update record for TERM4 contains only empty order update fields 313, thus indicated that this terminal is up to date on all order state changes within the restaurant.

Operationally, the terminal status element 305 may periodically transmit a first message to each of the terminals and update the connectivity status of the terminals based upon whether they acknowledge the first message or not. In one embodiment, the first message may comprise a ping message. In one embodiment, acknowledgment may comprise a simple acknowledge message. In other embodiments, acknowledgement may comprise additional data such as received signal strength indication RSSI, number of hops, or Global Positioning System (GPS) coordinates. The acknowledge message may further comprise configuration identification data such as terminal configuration (e.g., mobile order entry, order processing, kiosk, management terminal).

The terminal status element 305 may provide connectivity status of each of the terminals to the terminal update element 306 via bus STS. The service area map 307 is a table that associates each of the terminals to one or more service areas within the restaurant, as described above with reference to FIG. 1. In one embodiment, the terminal update element 306 may generate order update messages from oldest to youngest update for each of the terminals that are connected. Connectivity is maintained when a terminal acknowledges receipt of an order update message. Once acknowledged, the terminal update element 306 directs the queue processor 310 to delete the oldest order update for that terminal and shift pending order updates so that the next oldest order update becomes the oldest order update. In one embodiment, order updates are transmitted to a given terminal until its terminal update record 312 is empty, or until connectivity is broken.

In one embodiment, all of the terminals associated with the restaurant are updated by the terminal update element 306. In an alternative embodiment, terminals are selectively updated in accordance with their mapping to the one or more service areas, as indicated by contents of the service area map 307. For example, delivery terminals may only require knowledge of orders that are to be delivered outside the restaurant, and thus they may be mapped to a "delivery" service area so that order updates that correspond to the delivery service area are transmitted to the delivery terminals. Similarly, the restaurant or retail establishment may be so large that management dedicates certain terminals to designate service areas. Accordingly, all of the terminals in a given service area may be employed to update any order placed within the given service area, but they may not be employed to update orders placed outside of the given service area.

Messages received from the communications circuit 302 may also require additional functions to be performed by the backend server 300. For example, when orders are placed by a browser-based or third-party based terminal, the terminal update element 306 may transmit the order update to the order initiation element 303 via TBUS. The order initiation element 303 may then create an order ID for the order update and may assign the order ID to one or more of the terminals within the restaurant. Similarly, when an order update message received over the COMMS 302 requires processing of transactions outside of the terminals' capabilities (e.g., financial transactions with credit card providers, loyalty card discounts, etc.), the payment processor 304 may generate messages to complete the transactions and the messages are transmitted via COMMS 302. The payment processor 304 may further generate order updates (e.g., "order paid," "payment source 1 approved," "discount amount," etc.) to be transmitted to the terminals and may provide these updates to the terminal update element 306 via TBUS. The terminal update element 306 may then provide those updates to the durable queue 311 via QBUS, and the updates are transmitted to the POS terminals in due course dependent upon connection status, as is described above.

The backend server 300 according to the present invention is configured to perform the functions and operations as discussed above. The server 300 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the server 300 may be shared with other circuits, microcode, etc., that are employed to perform other functions and/or operations within the server 300. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The backend server 300 may be embodied as one or more central processing units (CPUs) that are coupled to both transitory and non-transitory storage (i.e., memory), where one or more application programs that are configured to perform the server functions discussed above are stored in the non-transitory storage, transferred to the transitory storage at run time, and executed by the one or more CPUs.

Figure 4:
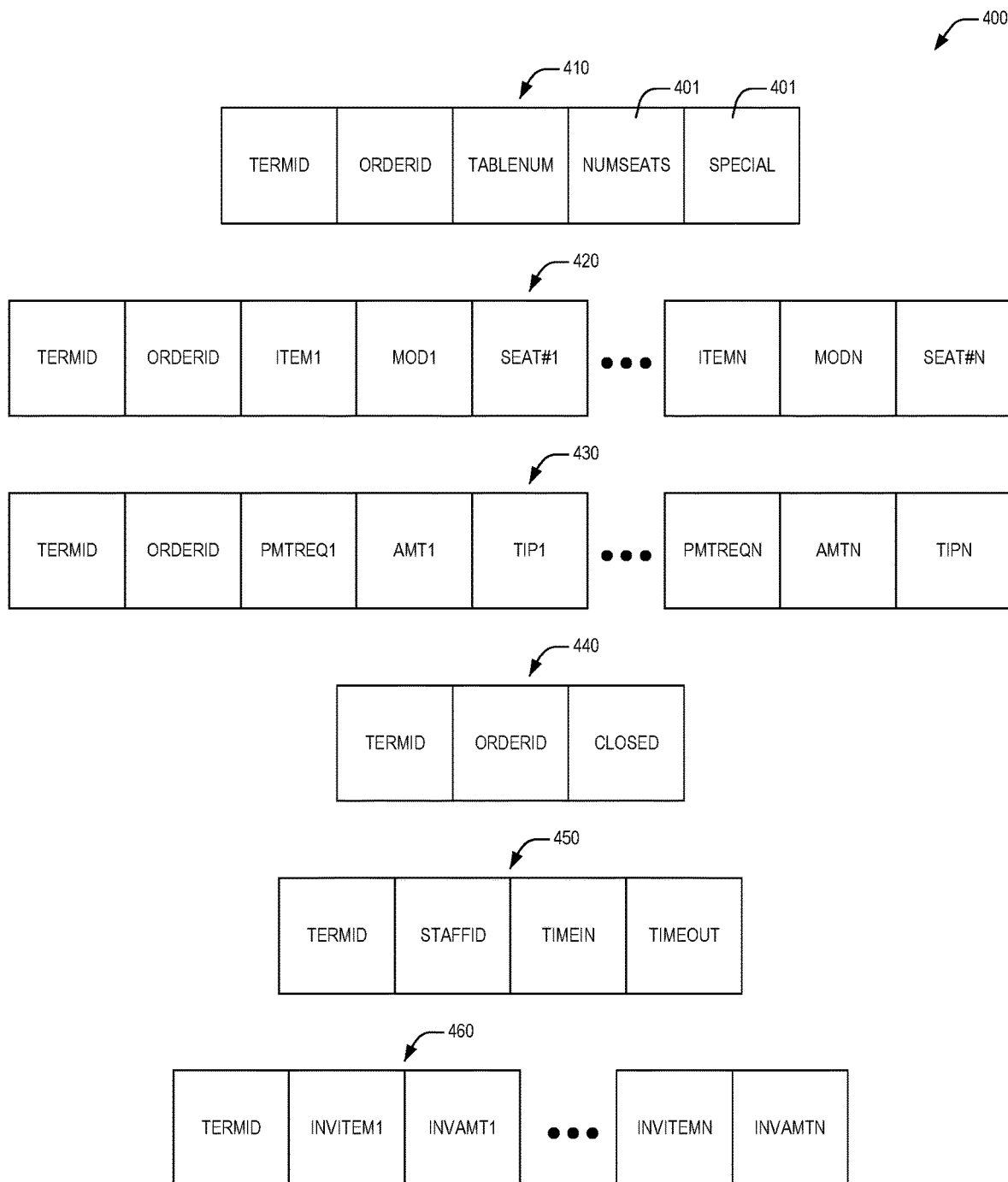
FIG. 4 is a block diagram showing exemplary update/status messages according to the present invention that flow between a backend server and a POS terminal.

Now referring to FIG. 4, a block diagram is presented showing exemplary update/status messages according to the present invention that flow between a backend server and a POS terminal.

An order assignment message 410 transmitted by the server to one or more POS terminals may comprise fields 401 having a specific terminal ID TERMID assigned for a particular order ID ORDERID along with a table number TABLENUM having a given number of seats NUMSEATS. The message 410 may further comprise a SPECIAL field 401 via which special requirements (e.g., high chair, wheel chair access) are communicated to the POS terminal.

An order state change message 420 transmitted from a POS terminal to the server may comprise TERMID and ORDERID fields 401 as described above, along with one or more groups of ITEM, MOD, and SEAT # fields 401, where contents of the ITEM field 401 indicated a menu item ordered for a given seat number at the table along with any modifications to the item number (e.g., rare, no onions, etc.).

A payment state change message 430 transmitted from a POS terminal to the server may comprise TERMID and ORDERID fields along with one or more groups of PMTREQ, AMT, and TIP fields 401, where contents of the PMTREQ field 401 indicates a payment type (e.g., cash, MasterCard, etc.), and contents of AMT and TIP indicate amount of payment for the particular payment type along with a tip amount.

An order closeout message 440 may comprise TERMID and ORDER ID fields 501 as noted above, along with a CLOSED field 401, the contents of which indicate whether the particular order ID is open or closed.

A time clock message 450 exchanged between a POS terminal and the server may comprise a TERMID field 401 as noted above along with a STAFFID, TIMEIN, and TIMEOUT fields 401, where the contents of TIMEIN and TIMEOUT indicate a duration of time for which a staff member identified by STAFFID has employed a particular POS terminal. The server may employ such messages 450 to calculate hours worked by the staff member.

An inventory message 460 may comprise a group of INVITEM and INVAMT fields 501, the contents of which indicate the amount of inventory remaining for a given inventory item as a result of processing current orders in the restaurant. Accordingly, the server may employ the noted amounts to expedite ordering of additional inventory items, or to instruct the POS terminals to remove certain corresponding menu items from their menus that are displayed to wait staff or patrons.

The messages 410, 420, 430, 440, 450, 460 are not exhaustive of those what may be employed according to the present disclosure, but are provided herein to teach further aspects and advantages according to the present invention.

Having now discussed the order fulfillment system according to the present invention, which includes hardwired and wireless terminals in both fixed and mobile configurations, attention is now directed toward aspects of a card reader having mag swipe, EMV, and NFC capabilities, that may additionally be configured for use in any of the above-noted terminals, or in stand-alone configurations, for obtaining credit card information and transmitting that information to payment processing elements in the terminals.

Figure 5:
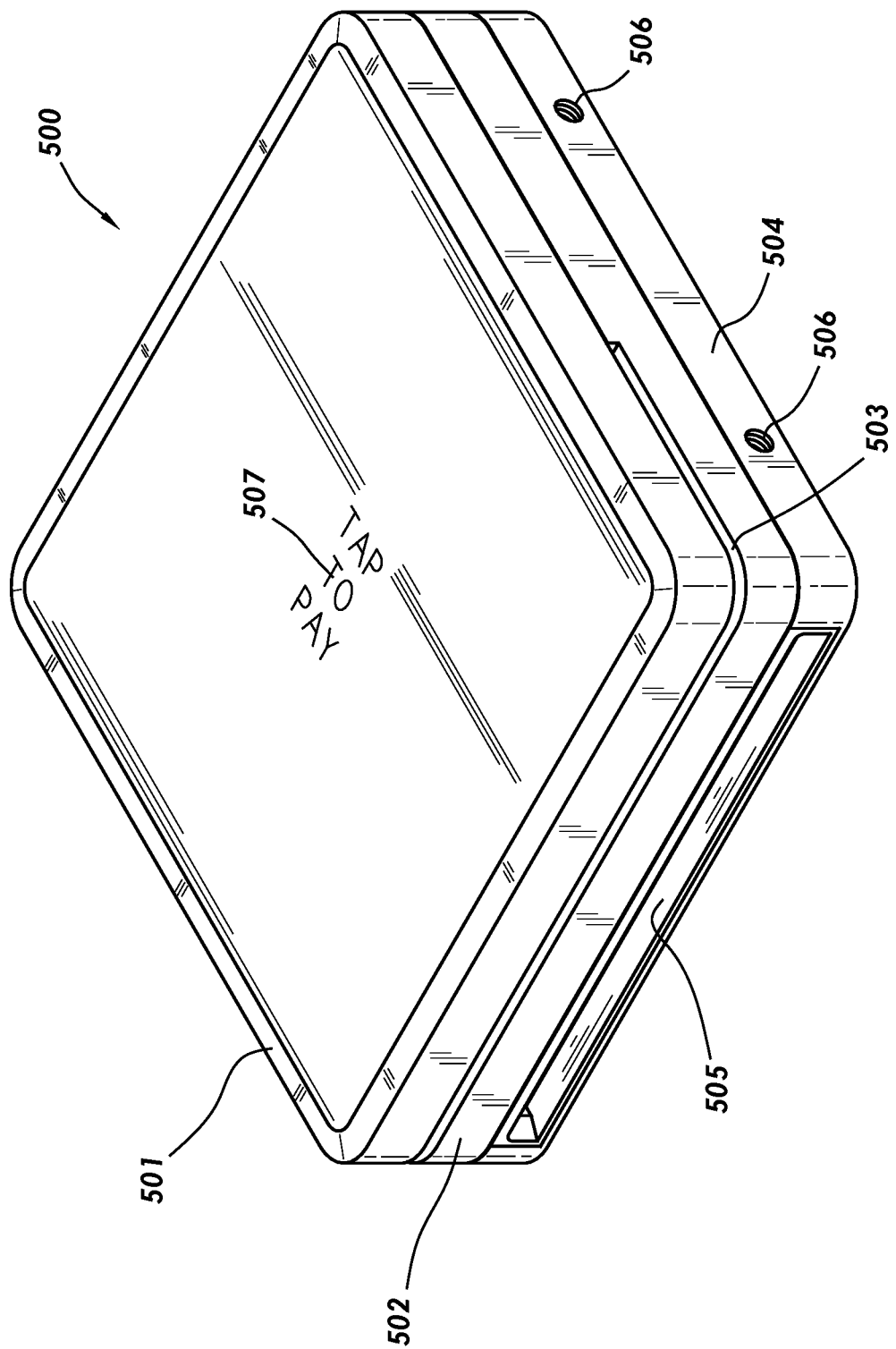
FIG. 5 is a diagram detailing a configurable credit card reader according to the present invention shown in a 0-degree configuration.
Figure 6:
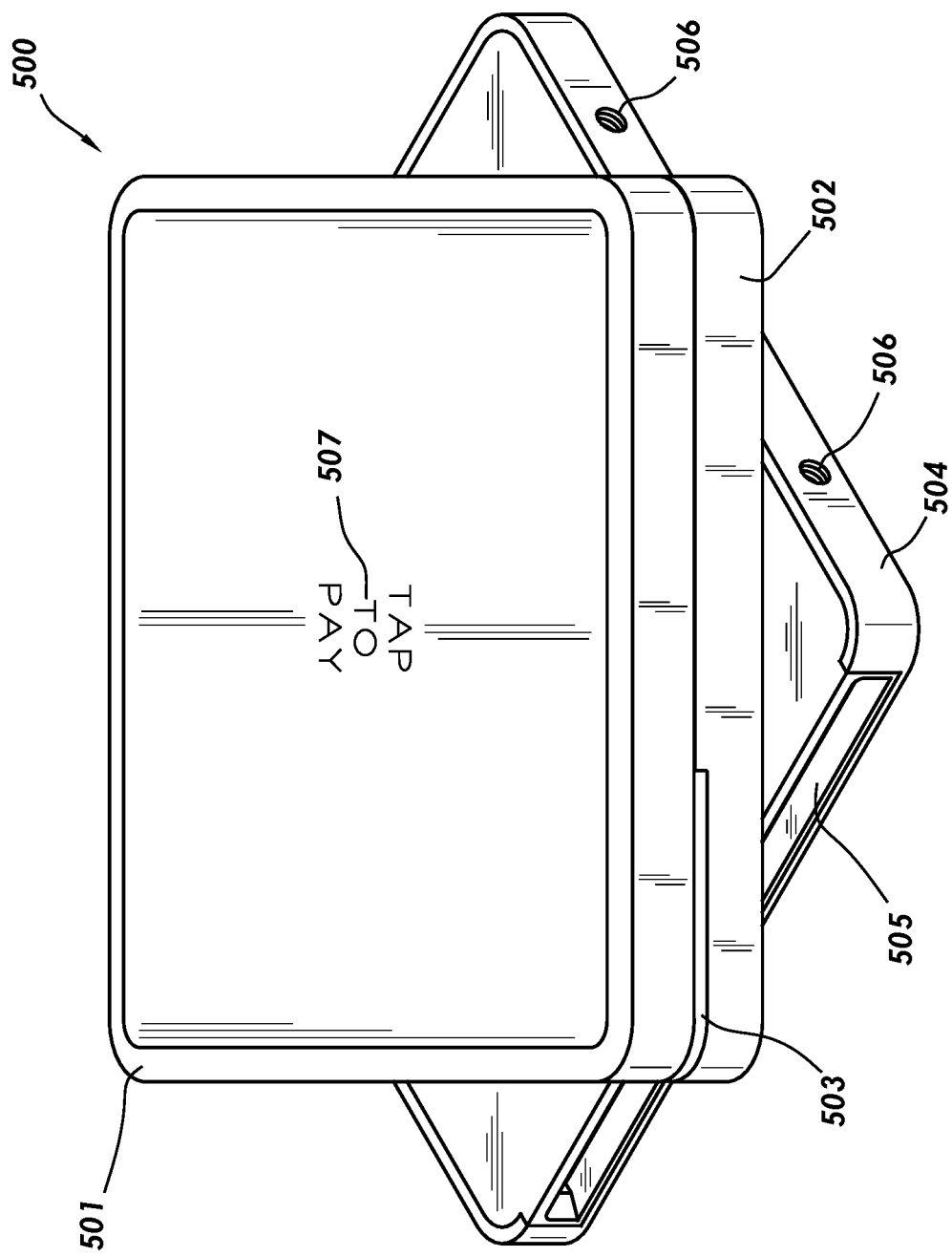
FIG. 6 is a diagram illustrating the configurable credit card reader according to the present invention shown in transition between a 0-degree configuration and a 90-degree configuration.
Figure 7:
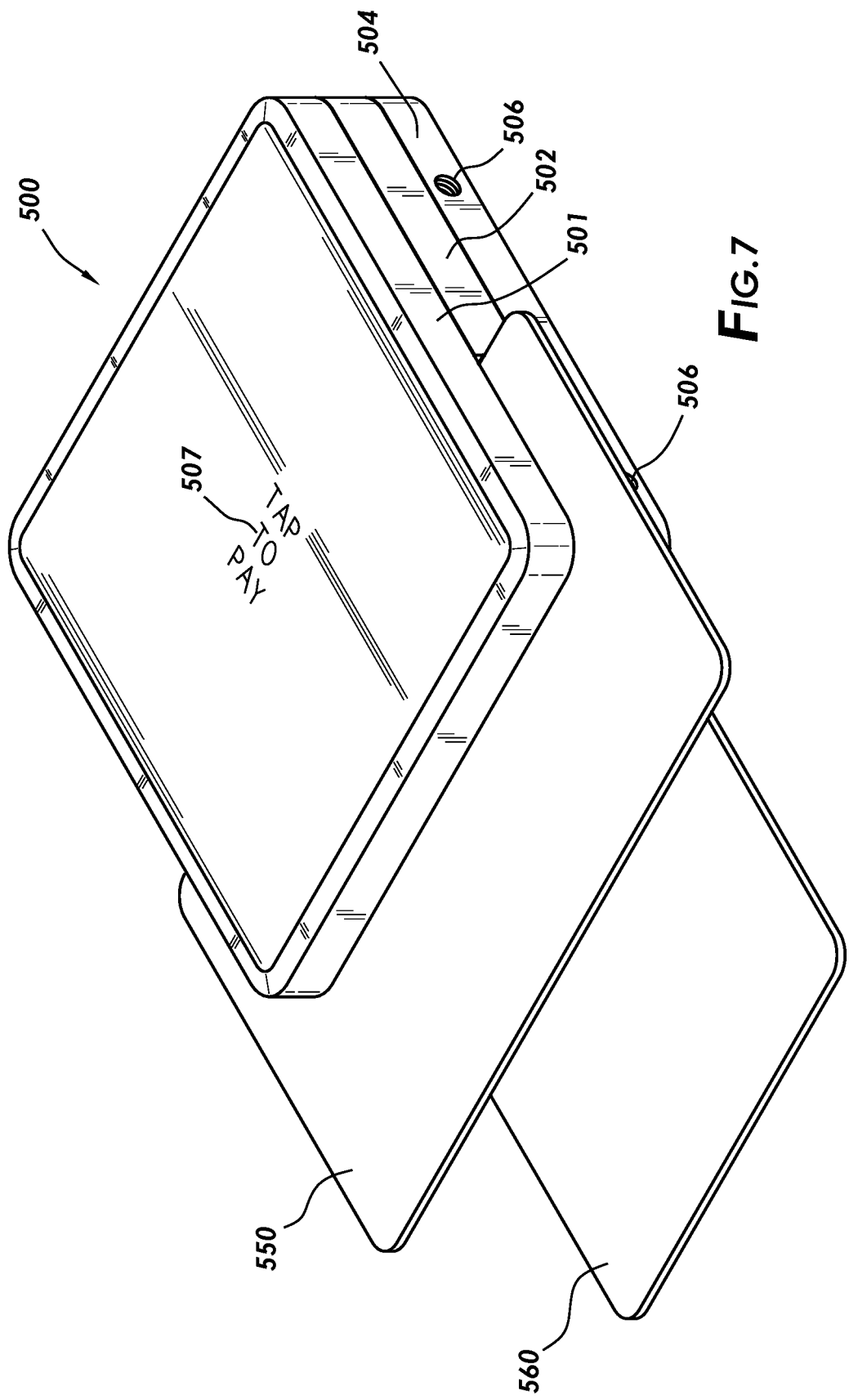
FIG. 7 is a diagram depicting the configurable credit card reader according to the present invention shown in a 0-degree configuration and that shows inserted credit cards.
Figure 8:
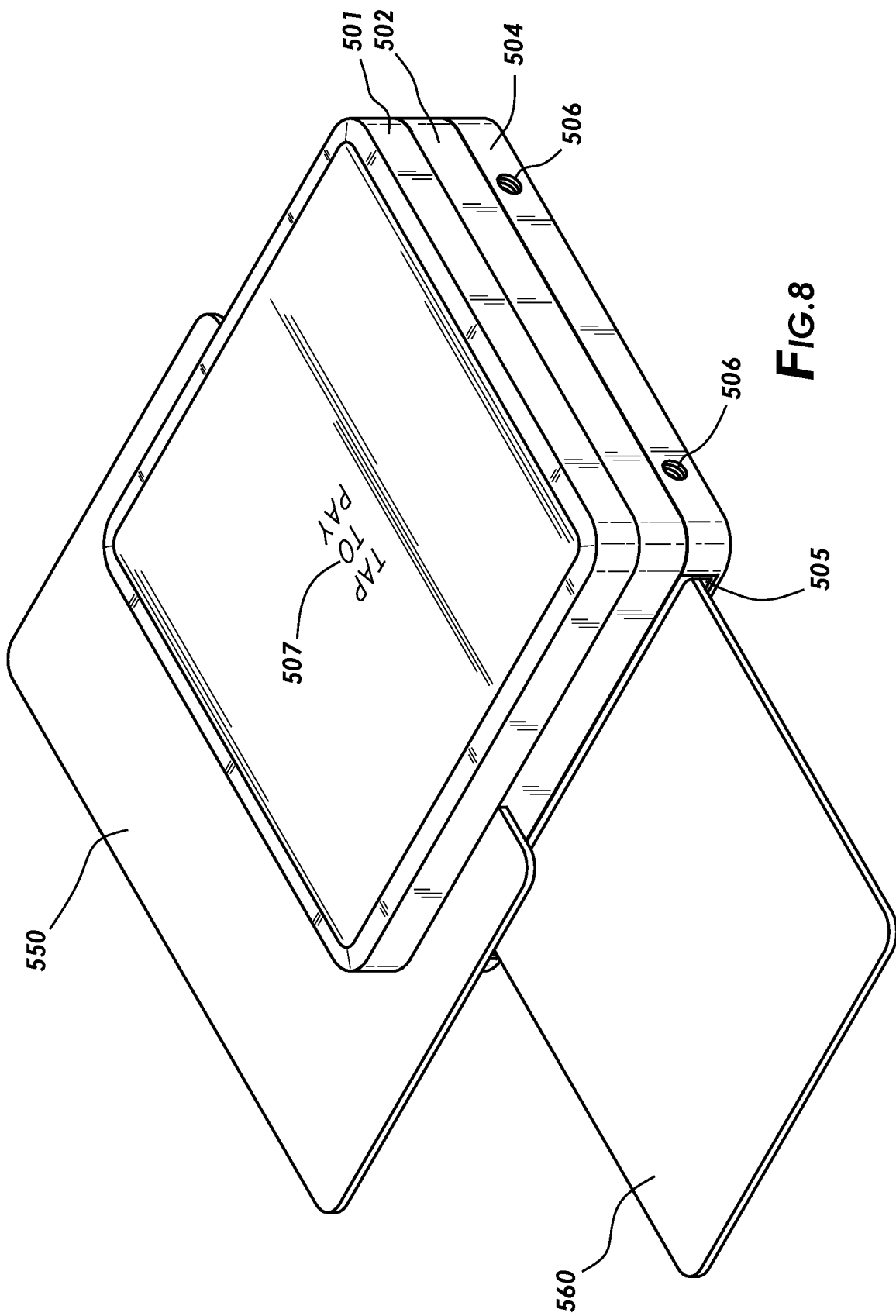
FIG. 8 is a diagram featuring the configurable credit card reader according to the present invention shown in a 90-degree configuration and that shows inserted credit cards.
Figure 9:
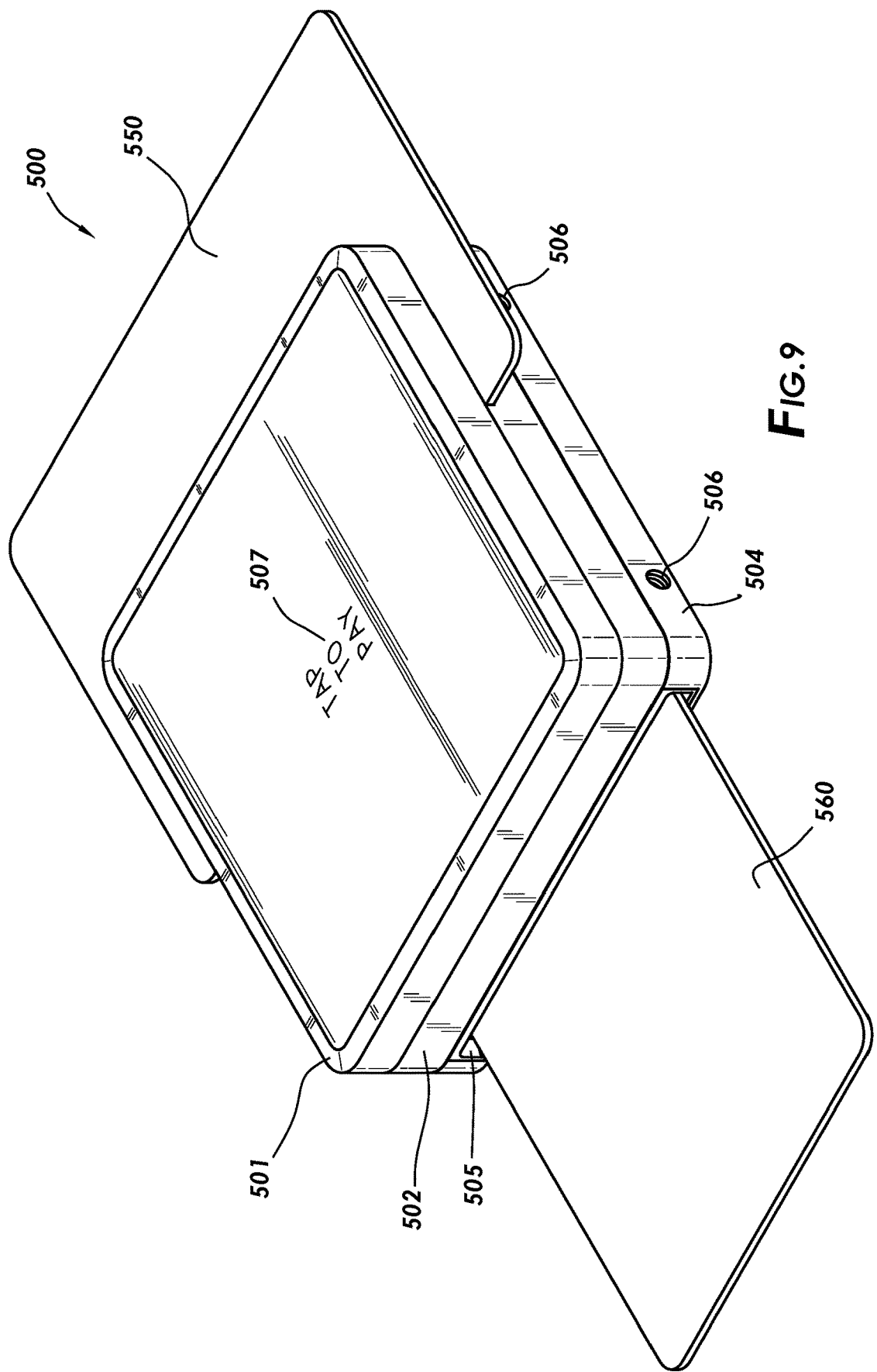
FIG. 9 is a diagram showing the configurable credit card reader according to the present invention shown in a 180-degree configuration and that shows inserted credit cards.
Figure 10:
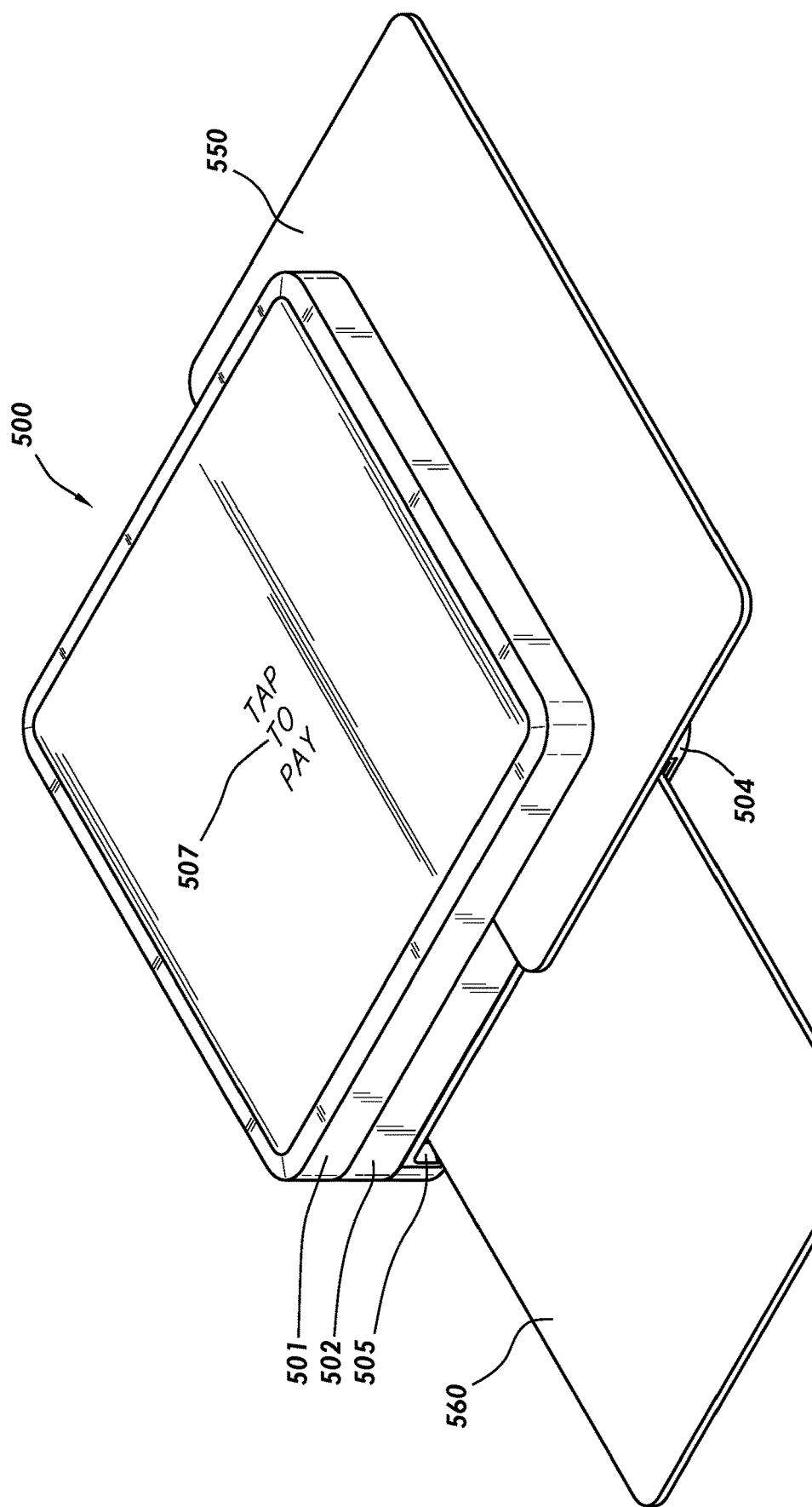
FIG. 10 is a diagram detailing the configurable credit card reader according to the present invention shown in a 270-degree configuration and that shows inserted credit cards.
Figure 11:
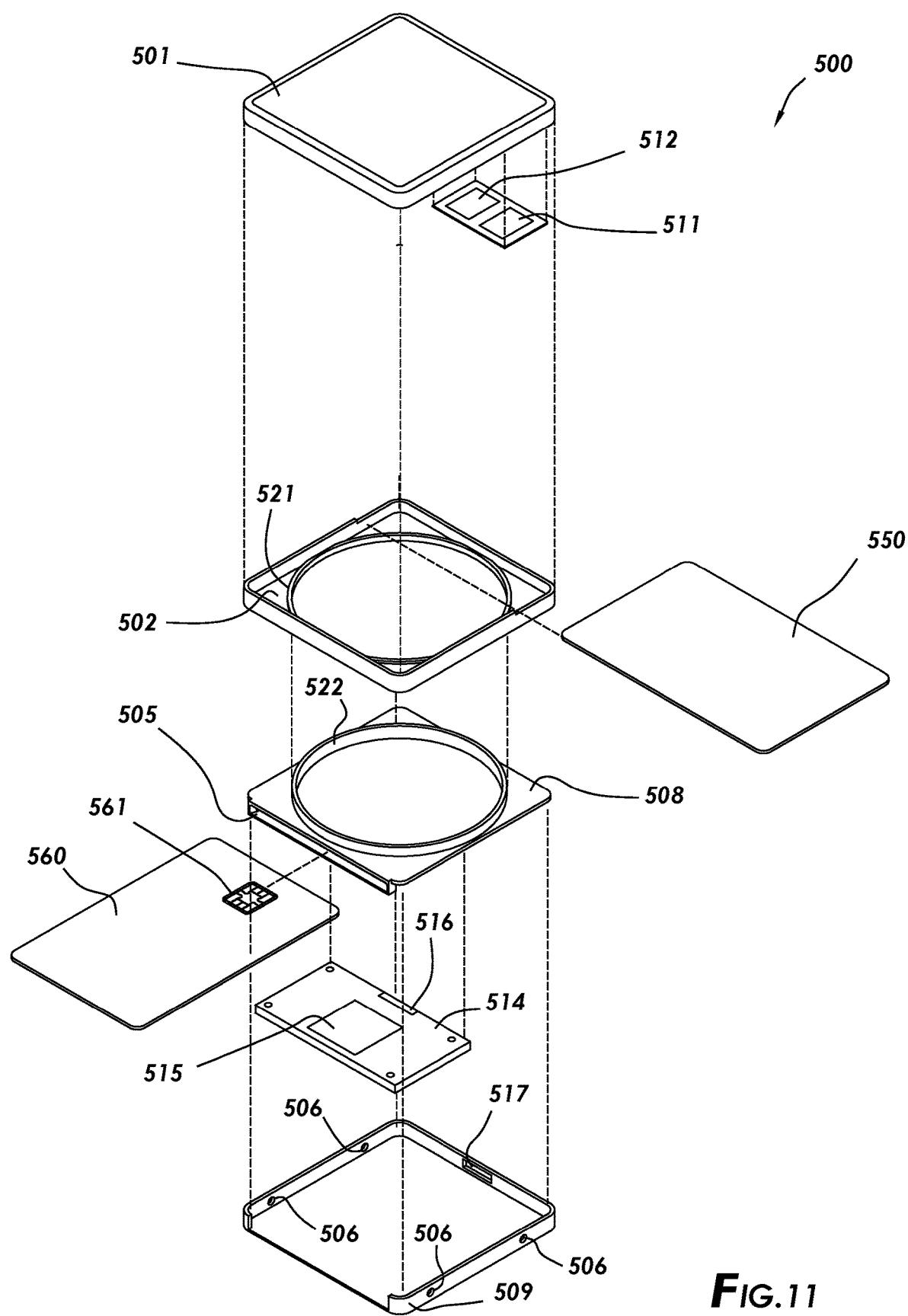
FIG. 11 is a diagram illustrating an exploded view of the configurable credit card reader according to the present invention as seen from an downward perspective.
Figure 12:
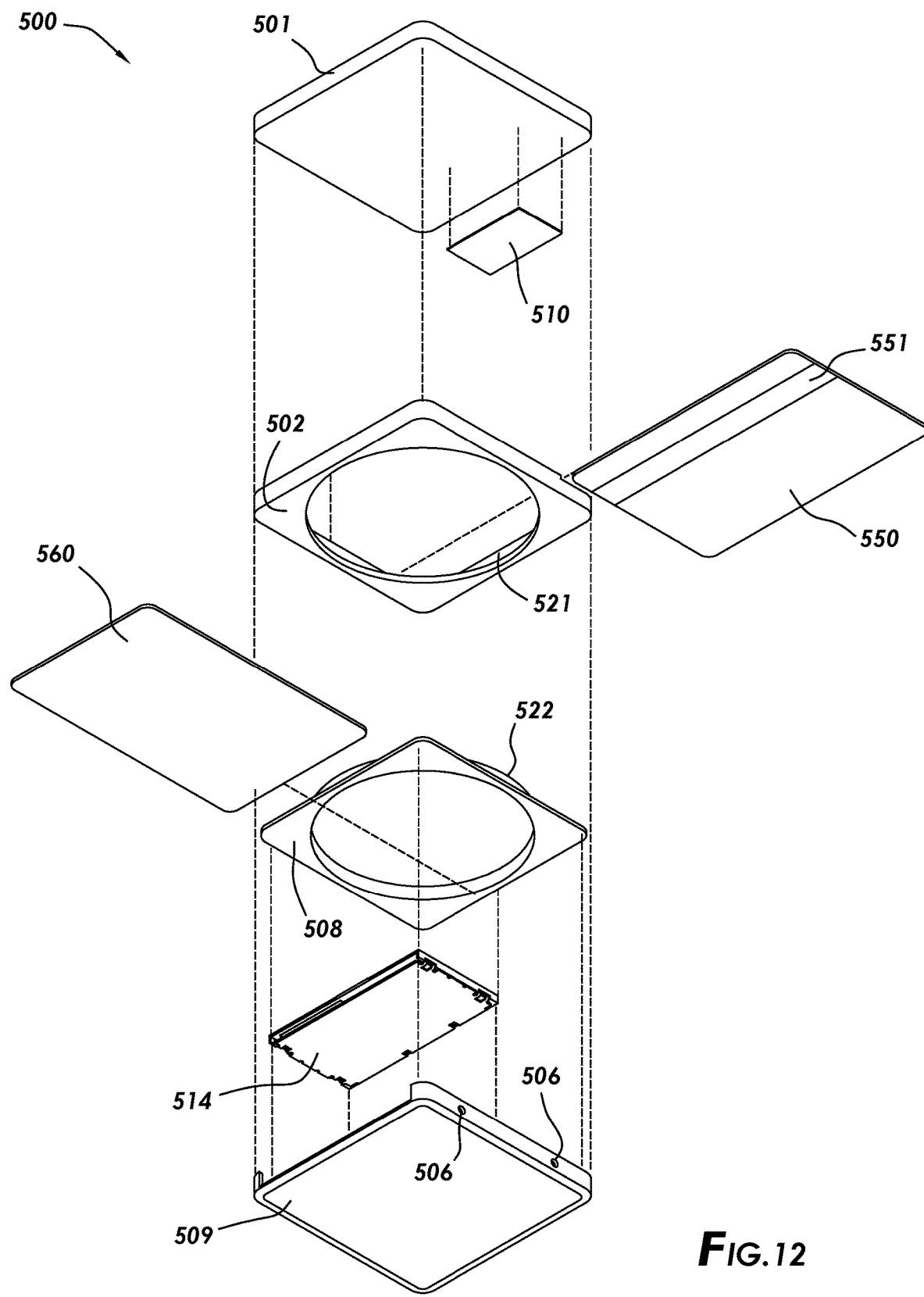
FIG. 12 is a diagram depicting an exploded view of the configurable credit card reader according to the present invention as seen from an upward perspective.

The following discussion will refer to FIGS. 5-12, where: FIG. 5 is a diagram detailing a configurable credit card reader 500 according to the present invention shown in a 0-degree configuration; FIG. 6 is a diagram illustrating the configurable credit card reader 500 according to the present invention shown in transition between a 0-degree configuration and a 90-degree configuration; FIG. 7 is a diagram depicting the configurable credit card reader 500 according to the present invention shown in a 0-degree configuration and that shows inserted credit cards; FIG. 8 is a diagram featuring the configurable credit card reader 500 according to the present invention shown in a 90-degree configuration and that shows inserted credit cards; FIG. 9 is a diagram showing the configurable credit card reader 500 according to the present invention shown in a 180-degree configuration and that shows inserted credit cards; FIG. 10 is a diagram detailing the configurable credit card reader 500 according to the present invention shown in a 270-degree configuration and that shows inserted credit cards; FIG. 11 is a diagram illustrating an exploded view of the configurable credit card reader 500 according to the present invention as seen from an downward perspective; and FIG. 12 is a diagram depicting an exploded view of the configurable credit card reader 500 according to the present invention as seen from an upward perspective.

For purposes of this application, the above noted configurations are indicative of a combined mag stripe/NFC reader assembly's orientation relative that an orientation of an EMV reader assembly, where both the combined mag stripe/NFC reader assembly is rotated (i.e., swiveled) within a plane in which both the mag stripe/NFC reader assembly and the EMV reader assembly are disposed, about a center axis that is perpendicular to the plane in which both the mag stripe/NFC reader assembly and the EMV reader assembly are disposed.

The configurable credit card reader 500 according to the present invention is preferably configured for use in one of four configurations: 1) a 0-degree configuration (FIG. 5) in which a mag stripe reader slot 503 is oriented on the same side of the reader 500 as an EMV reader slot 505; 2) a 90-degree configuration (FIG. 8) in which the mag stripe reader slot 503 is rotated 90 degrees clockwise, as viewed from the top face of the mag stripe/NFC reader assembly, to a side adjacent to the side of the reader 500 that has the EMV reader slot 505; 3) a 180-degree configuration (FIG. 9) in which the mag stripe reader slot 503 is rotated 180 degrees clockwise, as viewed from the top face of the mag stripe/NFC reader assembly, to a side opposite to the side of the reader 500 that has the EMV reader slot 505; and 4) a 270-degree configuration (FIG. 10) in which the mag stripe reader slot 503 is rotated 270 degrees clockwise, as viewed from the top face of the mag stripe/NFC reader assembly, to a side adjacent to the side of the reader 500 that has the EMV reader slot 505. FIG. 6 shows the reader 500 in a 45-degree configuration in which the mag stripe reader slot 503 is rotated 45 degrees clockwise, as viewed from the top face of the mag stripe/NFC reader assembly, to a side adjacent to the side of the reader 500 that has the EMV reader slot 505. The 45-degree configuration is provided to depict a transition from the 0-degree configuration to the 90-degree configuration for purposes of teaching aspects of the present invention. Though the 45-degree configuration and any other rotated angle configuration other than 0, 90, 180, and 270 degrees are not necessarily preferred embodiments, the present inventors not that the scope of the present invention extends to such orientations when the card reader 500 is configured for use.

Before elements of the configurable card reader 500 are discussed, the present inventors wish to reiterate reasons discussed above regarding the need in the art for such a reader 500. First, as one skilled in the art will appreciate, user experience with a payment system is the most significant factor in its acceptance. User experience not only encompasses pure functionality and speed of operation, but also ease of operation and heuristics. Accordingly, the orientation of a card reader 500—stand-alone or as part of a POS terminal—is an important factor, whether the user is a patron (as in a kiosk or customer-facing POS display application) or retail staff (as in a mobile or fixed terminal application). It goes without saying that no one—patrons nor staff—would prefer to swipe, dip, or tap a credit card in anything other than a comfortable position, and that position is purely a function of setup. For example, for a handheld mobile POS terminal, depending upon application, it may be desirable to configure the card reader 500 in a 0-degree configuration where EMV cards 560 having embedded chips 561 are inserted in the top of the terminal, mag stripe cards 550 having a coded magnetic stripe 551 thereon are swiped through a top slot from left to right, and contactless cards are tapped on a side or the terminal facing the staff person holding the terminal. Alternatively, it may be optimum to provide the reader 500 in a 90-degree configuration where EMV cards 560 are inserted in the top of the terminal, mag stripe cards 550 are swiped through a right side slot from top to bottom, and contactless cards are tapped on a side or the terminal facing the staff person holding the terminal. When integrated into a fixed POS terminal with the reader 500 installed on a right side, it may be desirable to provide the reader 500 in a 270-degree configuration where EMV cards 560 are inserted into the reader 500 from the bottom, mag stripe cards 550 are swiped through a right side slot from top to bottom, and contactless cards are tapped on a side or the terminal facing the staff person holding the terminal. When integrated into a fixed POS terminal with the reader 500 installed on a left side, it may be desirable to provide the reader 500 in a 90-degree configuration where EMV cards 560 are inserted into the reader 500 from the bottom, mag stripe cards 550 are swiped through a left side slot from top to bottom, and contactless cards are tapped on a side or the terminal facing the staff person holding the terminal. In a customer-facing stand-alone configuration, it may be desirable to provide the reader 500 in a 180-degree configuration, where the customer inserts EMV cards 560 from the bottom and swipes mag stripe cards 550 in a slot on the top from left to right. Many other configurations are conceivable where acceptance of the reader 500 depends upon presentation to the user.

To provide a card reader 500 that is configurable for use in any of the above-noted, and other, configurations is a remarkable improvement in the art, for the reader 500 only need be certified for use one time, as opposed to certifying four (or more) single-configuration readers, thus providing a substantial cost advantage over that which has heretofore been provided.

Accordingly, the reader may comprise a mag strip/tap reader assembly that has indicative print or embossment designating a tap to pay area 507 that allows for optimal placement of a contactless credit card. The tap to pay area 507 is on an outside face of a top plate 501 of the mag strip/tap reader assembly. The mag strip/tap reader assembly also comprises a bottom plate 502 that is coupled to the top plate 501. Both plates 501, 502, in one embodiment, are fabricated from molded plastic and may be coupled together via snap fit or screws (not shown). One end of the bottom plate 502 is notched in such a matter as to provide a swipe slot 503 and stop for a mag stripe card 550 that aligns the card 550 with one or more mag stripe reader heads (not shown).

The mag strip/tap reader assembly further comprises a mag strip/tap reader circuit card assembly 510 that includes an NFC antenna/reader circuit 512 for contactless cards and a mag stripe reader circuit 511 for mag stripe cards 550. The mag strip/tap reader circuit card assembly 510, in one embodiment, is coupled to the inside of the top plate 501 via snap fit, screws, or comparable attachment mechanisms. The mag strip/tap reader circuit card assembly 510 is coupled to the mag stripe reader head(s) via flex cable (not shown) designed as a spiral coil to allow for multiple rotations about the center axis. Alternatively, the mag strip/tap reader circuit card assembly 510 is coupled to the mag stripe reader head(s) via a conventional slip ring and brush connection. The bottom plate 502 of the mag stripe/tap reader assembly comprises a mag strip/tap reader collar 521 that forms a circular interstice thereon, where the collar 521 extends on a face of the bottom plate 502 in the direction of an EMV reader assembly, to which the mag stripe/tap reader is coupled for configuration.

The EMV reader assembly comprises a top plate 508 that includes an EMV reader collar 522 that extends in the direction of the mag stripe/tap reader assembly. In one embodiment, the EMV reader collar 522 is of a diameter slightly greater than the mag stripe/tap collar 521, so that when the collars 521-522 are connected, a press fit or snap fit junction is formed to hold the mag stripe/tap reader assembly to the EMV reader assembly. In another embodiment, the EMV reader collar 522 is of a diameter slightly less than the mag stripe/tap collar 521, so that when the collars 521-522 are connected, they overlap and a press fit or snap fit junction is formed to hold the mag stripe/tap reader assembly to the EMV reader assembly. In one embodiment, the collars 521-522 are fabricated such that rotational stops are created at 0, 90, 180, and 270 degrees to allow for rapid configuration for use. In one embodiment, the collars 521-522 are rated for IP54 or higher operation to provide a high degree of protection against particles and liquid, which are common in restaurant environments.

The EMV reader assembly further includes a bottom plate 509 that is coupled to the top plate 508. Both plates 508-509, in one embodiment, are fabricated from molded plastic and may be coupled together via snap fit or screws (not shown). The bottom plate 509 may be notched at an end where an EMV card 560 having an EMV chip 561 embedded thereon is inserted. The top plate 508 has an extended side that mates with the notched end of the top plate 508 when assembled. The extended side is fabricated such that a rectangular insertion slot 505 for the EMV card 560 is formed. The insertion slot 505 further provides for alignment of the embedded chip 561 on the card 560 with an EMV reader circuit component 515 disposed on an EMV reader circuit card assembly 514, where the EMV reader circuit card assembly 514 is affixed to the top plate 508 via snap fit, screws, or comparable attachment mechanisms In one embodiment, the mag strip/tap reader circuit card assembly 510 is coupled to the EMV circuit card assembly 514 via the spiral coil flex cable described a above that is routed through the interstice formed by the collars 521-522. The EMV reader circuit card assembly 514, in one embodiment, may comprise a connector 516 that projects through a corresponding hold 517 in the bottom plate 509 when assembled that provides for coupling of the card reader 500 to payment processing elements in fixed/mobile terminals. In one embodiment, the connector 516 comprises a USB-C-style connector having a proprietary pinout.

The bottom plate 509 may further comprise one or more threaded inserts 506 that provide for mounting of the card reader 500 within a mobile/fixed terminal, to the housing of a mobile/fixed terminal, or to a dock or stand (not shown) when disposed in a stand-alone configuration.

In one embodiment, the card reader 500 is approximately 60-70 mm square on the sides and approximately 15-25 mm in height. The interstice formed by the interlocking collars 521-522 is approximately 40-50 mm in diameter, but may be sized to accommodate the spiral flex cable that couples together the circuit card assemblies 510, 514.

Operationally, when assembled, the mag stripe/tap reader assembly may be rotated to a desirable configuration, as described above, disposed within or attached to a mobile terminal, fixed terminal, or dock, and coupled to payment processing elements via a cable or flex cable via the connector 516. Advantageously, the configurable card reader 500 according to the present invention provides for a single, configurable for use reader that need only undergo a single certification process.

Figure 13:
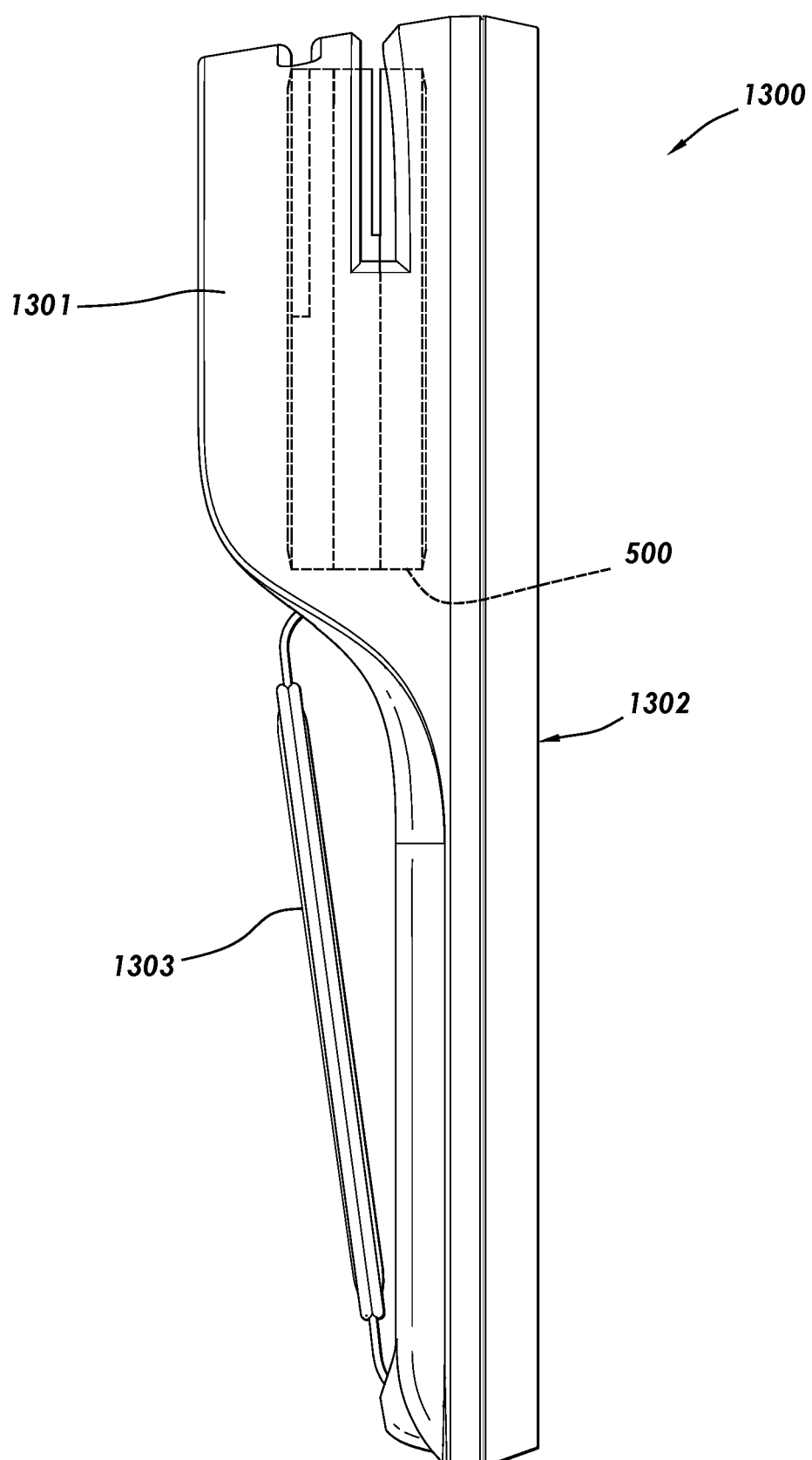
FIG. 13 is a diagram featuring a mobile POS terminal according to the present invention that includes the configurable credit card reader configured in a 0-degree configuration.

Turning now to FIG. 13, a diagram is presented featuring a mobile POS terminal 1300 according to the present invention that includes the credit card reader 500 configured for use in a 0-degree configuration. The mobile POS terminal 1300 may comprise a housing 1301, a touchscreen display 1302, and a hand strap 1303. The housing 1301 may be fabricated to provide openings and mounting features so that when the card reader 500 is disposed therein mag stripe cards 550 may be swiped though the slot 503, EMV cards 560 may be dipped in the EMV slot 505, and contactless cards may be tapped on the face of the touchscreen display 1302.

Figure 14:
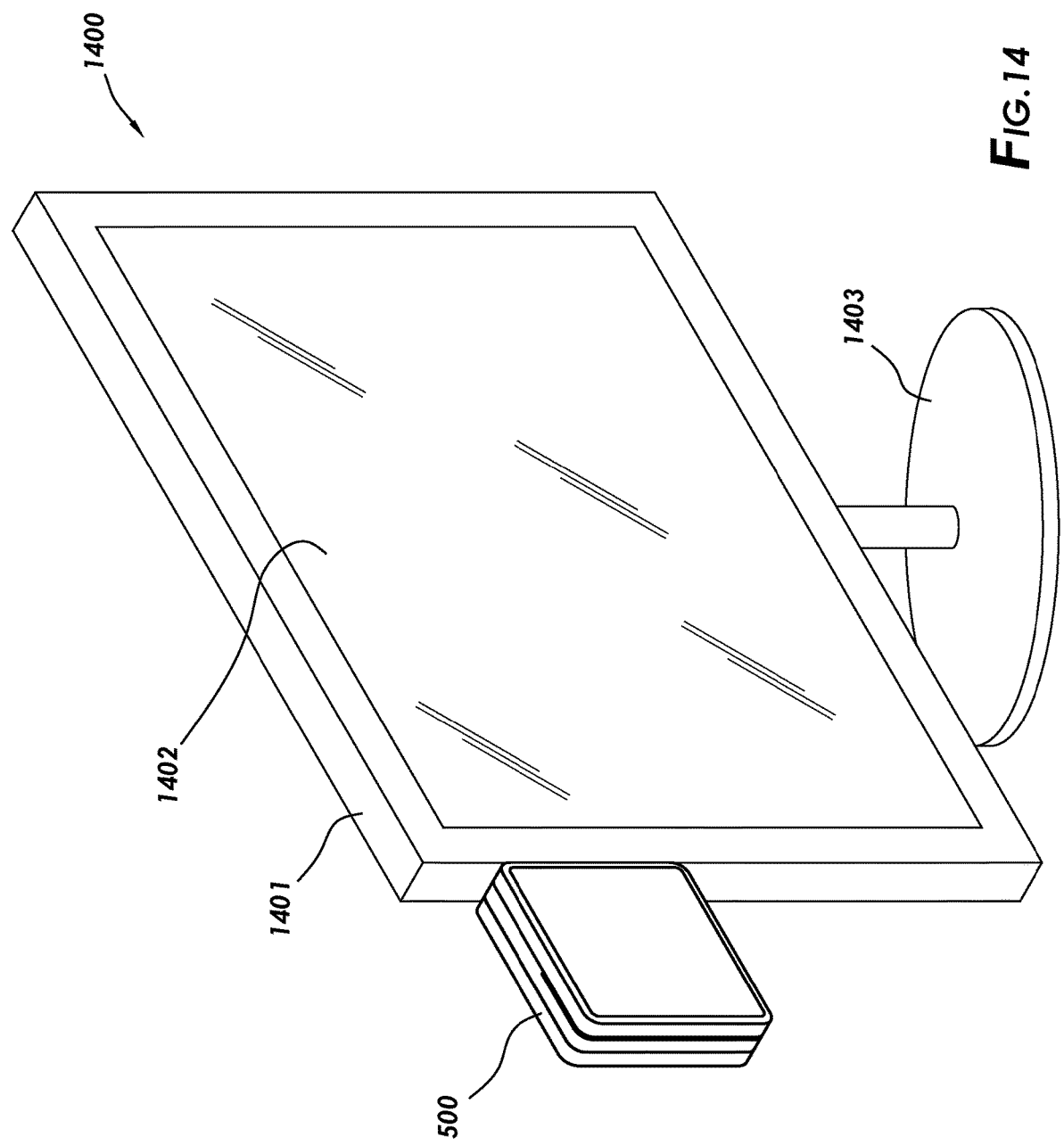
FIG. 14 is a diagram showing a fixed POS terminal according to the present invention that includes the configurable credit card reader configured for left-handed operation.

Referring now to FIG. 14, a diagram is presented showing a fixed POS terminal 1400 according to the present invention that includes the credit card reader 500 configured for left-handed operation in a 90-degree configuration with EMV slot 505 (not shown) on the bottom and mag stripe reader slot 503 on the left side. The fixed POS terminal 1400 may comprise a housing 1401, a touchscreen display 1402, and a mounting device 1403 to which the housing 1401 is affixed. Although the mounting device 1403 is shown in the diagram as a stand, the present inventors note that that other embodiments of the mounting device such as, but not limited to, as dock, a cradle, a swivel arm, or any other type of device that allows to mounting the terminal 1400 in a fixed location. Accordingly, mag stripe cards 550 may be swiped though the slot 503, EMV cards 560 may be dipped upwards into the EMV slot 505, and contactless cards may be tapped on the face of the reader that is on the same side of the terminal 1400 as the touchscreen display 1402.

Figure 15:
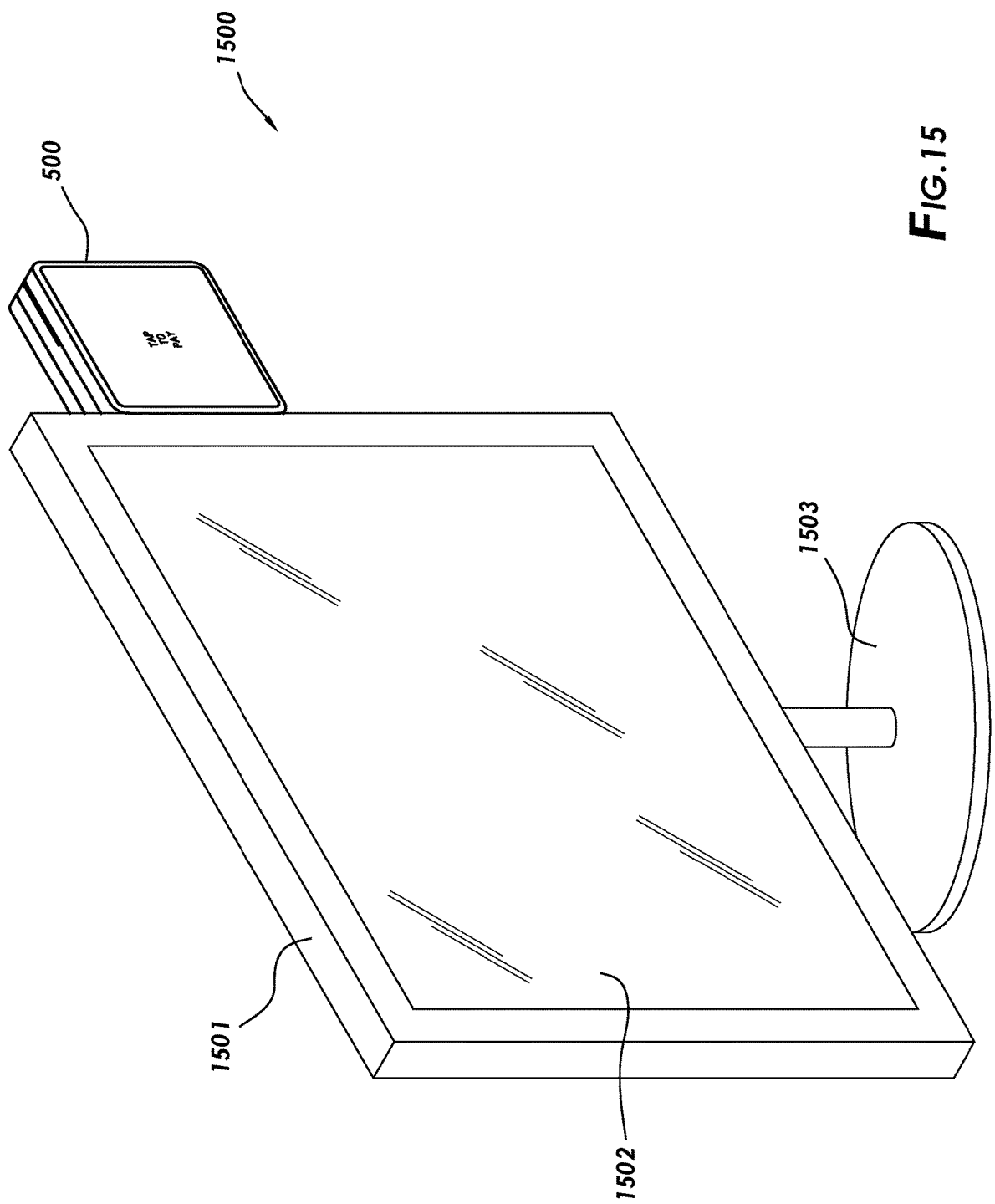
FIG. 15 is a diagram detailing a fixed POS terminal according to the present invention that includes the configurable credit card reader configured for right-handed operation.

Turning now to FIG. 15, a diagram is presented showing a fixed POS terminal 1500 according to the present invention that includes the credit card reader 500 configured for right-handed operation in a 270-degree configuration with EMV slot 505 (not shown) on the bottom and mag stripe reader slot 503 on the right side. The fixed POS terminal 1500 may comprise a housing 1501, a touchscreen display 1502, and a mounting device 1503 to which the housing 1501 is affixed. Although the mounting device 1503 is shown in the diagram as a stand, the present inventors note that that other embodiments of the mounting device such as, but not limited to, as dock, a cradle, a swivel arm, or any other type of device that allows to mounting the terminal 1500 in a fixed location.

Figure 16:
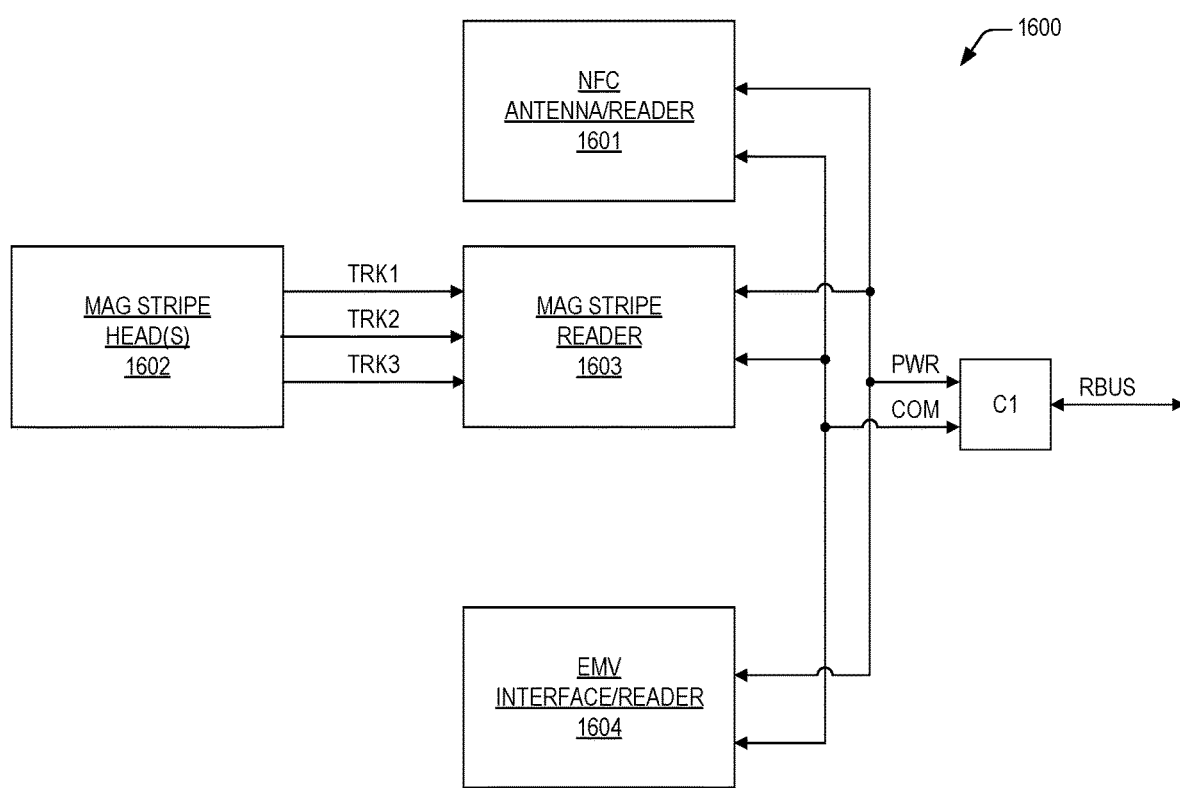
FIG. 16 is a block diagram circuit illustrating circuit components of the configurable card reader according to the present invention.

FIGS. 15-16 disclose exemplary embodiments of the present invention when configured for use with a fixed POS terminal 1400, 1500; however, the present inventors note that embodiments for fixed POS terminals 1400, 1500 are not constrained to only left-handed and right-handed operation. Rather, similar to the embodiments described with reference to FIGS. 14-15, where the credit card reader 500 is attached in the same plane as the touchscreen display 1402, 1502, the credit card reader 500 may be configured perpendicular to the touchscreen display 1402, 1502 to allow for a smaller counter footprint, which is very important in fast casual retail spaces that want to maximize square foot usage. In addition, the credit card reader 500 may be attached to the top of the housing 1401, 1501, but facing a direction opposite to the touchscreen display 1402, 1502, thus enabling a patron to enter payment in a quick and intuitive manner. Advantageously, this configuration allows for patron payment without the retail establishment having to purchase expensive second screens or "brick" card readers with screens, such as those manufactured by Verifone, Ingenico, and other present-day providers.

Finally, as noted above, the credit card reader 500 according to the present invention may be configured in any orientation disclosed herein as a stand-alone reader where the credit card reader 500 is disposed in a dock, cradle, or similar housing and is coupled to a POS terminal via a cable coupled to connector C1 and a corresponding connector on the terminal. Advantageously, such an embodiment provides a retail establishment the highest flexibility to place the reader 500 (and any associated touchscreens 1402, 1502) at locations to meet requirements for height and depth of access that are stipulated by the Americans with Disabilities Act (ADA).

Finally turning to FIG. 16, a block diagram 1600 is presented illustrating circuit components of the configurable card reader 500 according to the present invention. FIGS. 11-12 show these components disposed on a mag stripe/tap circuit card assembly 510 and an EMV circuit card assembly 514 that are coupled to plates 501 and 508, respectively, within the card reader 500, where the circuit card assemblies 510, 514 are coupled together via a flex cable and where a connector 516 is provided to couple the circuit card assemblies 510, 514 to payment processing components. The present inventors note, however, that such division of the components into two circuit card assemblies is a design choice based on end use and the circuit components may be disposed on a single printed circuit card assembly, more than two circuit card assemblies, or in other conventional divisions.

The diagram 1600 comprises an NFC antenna/reader 1601 that is coupled via a power bus PWR and communications bus COM to connector C1. The diagram additionally shows a mag stripe reader 1603 that is coupled to C1 and the NFC Antenna/Reader 1601 via PWR and COM. One or more mag stripe reader heads 1602 are coupled to the mag stripe reader 1603 via busses TRK1, TRK2, and TRK3. The diagram 1600 further shows an EMV interface/reader element 1604 that is coupled C1, the NFC antenna/reader element 1601, and the EMV interface/reader element 1604 via PWR and COM. A wired or flex connection RBUS provides for coupling the reader elements 1601-1604 to a POS terminal payment processing element via bus RBUS, as described with reference to FIG. 2.

Power is provided via the power bus PWR. Communication of encrypted cardholder data to the POS terminal payment processing element is provided over bus COM. Buses PWR and COM are combined at connector C1 into bus RBUS.

The NFC antenna/reader 1601 may comprise a conventional near field communications antenna (not shown) disposed in a location that provides for acceptable reception and communication with contactless credit cards placed near a designated (e.g., TAP TO PAY) location indicated on an outside face of the configurable credit card reader 500. The NFC antenna/reader 1601 may further comprise conventional NFC reader circuits (not shown) that provide for communication with the NFC antenna; extraction, amplification, decoding, formatting, and encryption of the cardholder data; and transmission of encrypted cardholder data to the POS terminal payment processing element. In one embodiment, the NFC antenna/reader 1601 may be configured for interoperation with one or more NFC range extenders to allow a patron to tap in other locations on a fixed or mobile POS terminal to accommodate ease of payment workflow within the retail establishment.

The EMV interface/reader 1603 may comprise a conventional EMV chip interface (not shown) disposed in a location that provides for coupling an EMV chip disposed within an inserted EMV card to a conventional EMV reader circuits (not shown) that provide for communication with the EMV chip; extraction, amplification, decoding, formatting, and encryption of the cardholder data; and transmission of encrypted cardholder data to the POS terminal payment processing element.

The mag stripe reader may comprise well known mag stripe reader circuits (not shown) that provide for communication with the mag stripe head(s) 1602 via buses TRK1, TRK2, and TRK3; extraction, amplification, decoding, formatting, and encryption of the cardholder data; and transmission of encrypted cardholder data to the POS terminal payment processing element.

The card reader elements 1601-1604 according to the present invention are configured to perform the functions and operations as discussed above. The card reader elements 1601-1604 comprise logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the card reader elements 1601-1604 may be shared with other circuits, microcode, etc., that are employed to perform other functions and/or operations within the card reader elements 1601-1604.

The card reader elements 1601-1604 may be embodied as one or more central processing units (CPUs) that are coupled to both transitory and non-transitory storage (i.e., memory), where one or more application programs that are configured to perform the server functions discussed above are stored in the non-transitory storage, transferred to the transitory storage at run time, and executed by the one or more CPUs.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, flex cable, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. A fixed point-of-sale (POS) terminal, comprising:
 a mounting device for affixing the fixed POS terminal in a fixed location;
 a housing that is coupled said mounting device;
 a touchscreen display on a face of said housing; and
 a credit card reader that is configurable for use disposed within said housing, said credit card reader comprising:
  a first assembly comprising a mag stripe card reader; and a second assembly comprising a Europay Mastercard Visa (EMV) reader, said second assembly coupled to said first assembly;

wherein said first assembly rotates about an axis perpendicular to a plane in which said assemblies are disposed to one of a plurality of angular positions, said plurality of angular positions indicating an offset angle of said first assembly relative to said second assembly, and wherein said credit card reader is coupled to said housing in said one of said plurality of positions.

2. The credit card reader as recited in claim 1, wherein said plurality of angular positions comprises 0 degrees 180 degrees.

3. The credit card reader as recited in claim 2, wherein said plurality of angular positions further comprises 90 degrees 270 degrees.

4. The credit card reader as recited in claim 1, wherein said first assembly comprises a first collar forming a first circular interstice on a bottom side of said first assembly, that is coupled to a second collar forming a second circular interstice on a top side of said second assembly.

5. The credit card reader as recited in claim 4, wherein said assemblies are fabricated from plastic and are coupled together via press fit.

6. The credit card reader as recited in claim 5, wherein said collars are fabricated to create rotational stops corresponding to each of said plurality of angular positions.

7. The credit card reader as recited in claim 6, wherein said first assembly further comprises a contactless card reader.

8. A fixed point-of-sale (POS) terminal, comprising:
a mounting device for affixing the fixed POS terminal in a fixed location;
a housing that is coupled said mounting device;
a touchscreen display on a face of said housing; and
a credit card reader that is configurable for use disposed within said housing, said credit card reader comprising:
a first assembly comprising a contactless card reader and a mag stripe card reader; and
a second assembly comprising a Europay Mastercard Visa (EMV) reader, said second assembly coupled to said first assembly;
wherein said first assembly rotates about an axis perpendicular to a plane in which said assemblies are disposed to one of a plurality of angular positions, said plurality of angular positions indicating an offset angle of said first assembly relative to said second assembly, and wherein said credit card reader is coupled to said housing in said one of said plurality of positions.

9. The credit card reader as recited in claim 8, wherein said plurality of angular positions comprises 0 degrees 180 degrees.

10. The credit card reader as recited in claim 9, wherein said plurality of angular positions further comprises 90 degrees 270 degrees.

11. The credit card reader as recited in claim 8, wherein said first assembly comprises a first collar forming a first circular interstice on a bottom side of said first assembly, that is coupled to a second collar forming a second circular interstice on a top side of said second assembly.

12. The credit card reader as recited in claim 11, wherein said assemblies are fabricated from plastic and are coupled together via press fit.

13. The credit card reader as recited in claim 12, wherein said collars are fabricated to create rotational stops corresponding to each of said plurality of angular positions.

14. A method for configuring a credit card reader for use as part of a fixed point-of-sale (POS) terminal, the method comprising:
coupling a credit card reader to the fixed POS terminal, the fixed POS terminal comprising a mounting device for affixing the fixed POS terminal in a fixed location, a housing that is attached to the mounting device, and a touchscreen display on a face of the housing, said coupling comprising:
first disposing a mag stripe card reader within a first assembly;
second disposing a Europay Mastercard Visa (EMV) reader within a second assembly; and
coupling the second assembly to the first assembly, wherein the first assembly rotates about an axis perpendicular to a plane in which the assemblies are disposed to one of a plurality of angular positions, the plurality of angular positions indicating an offset angle of the first assembly relative to the second assembly, and wherein the credit card reader is coupled to said housing in said one of said plurality of positions.

15. The method as recited in claim 14, wherein the plurality of angular positions comprises 0 degrees 180 degrees.

16. The method as recited in claim 15, wherein the plurality of angular positions further comprises 90 degrees 270 degrees.

17. The method as recited in claim 15, wherein the first assembly comprises a first collar forming a first circular interstice on a bottom side of the first assembly, that is coupled to a second collar forming a second circular interstice on a top side of the second assembly.

18. The method as recited in claim 17, wherein the assemblies are fabricated from plastic and are coupled together via press fit.

19. The method as recited in claim 18, wherein the collars are fabricated to create rotational stops corresponding to each of the plurality of angular positions.

20. The method as recited in claim 19, wherein said first disposing further comprises:
third disposing a contactless card reader within the first assembly.

* * * * *